US009462182B2

(12) United States Patent
Togita

(10) Patent No.: US 9,462,182 B2
(45) Date of Patent: Oct. 4, 2016

(54) IMAGING APPARATUS AND CONTROL METHOD THEREOF

(71) Applicant: CANON KABUSHIKI KAISHA, Tokyo (JP)

(72) Inventor: Koji Togita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/596,489

(22) Filed: Jan. 14, 2015

(65) Prior Publication Data

US 2015/0208045 A1 Jul. 23, 2015

(30) Foreign Application Priority Data

Jan. 17, 2014 (JP) ................................. 2014-007272

(51) Int. Cl.
*H04N 5/232* (2006.01)
*H04N 5/77* (2006.01)
*H04N 9/804* (2006.01)
*H04N 9/82* (2006.01)

(52) U.S. Cl.
CPC ...... *H04N 5/23219* (2013.01); *H04N 5/23245* (2013.01); *H04N 5/772* (2013.01); *H04N 9/8042* (2013.01); *H04N 9/8205* (2013.01); *H04N 5/23241* (2013.01)

(58) Field of Classification Search
CPC ............. H04N 9/045; H04N 5/23219; H04N 5/23245; H04N 5/772; H04N 9/8042; H04N 9/8205; H04N 5/23241
USPC .......................................................... 348/372
See application file for complete search history.

(56) References Cited

U.S. PATENT DOCUMENTS

| 8,184,178 | B2* | 5/2012 | Kuo ..................... H04N 9/8047 348/222.1 |
| 2002/0027675 | A1* | 3/2002 | Minato .............. H04N 1/00214 358/1.15 |
| 2006/0050975 | A1* | 3/2006 | Ito .......................... H04N 19/15 382/232 |
| 2008/0151076 | A1* | 6/2008 | Takane ................... H04N 5/772 348/231.99 |

FOREIGN PATENT DOCUMENTS

JP 2011-244423 A 12/2011

* cited by examiner

*Primary Examiner* — Gevell Selby
(74) *Attorney, Agent, or Firm* — Carter, DeLuca, Farrell & Schmidt, LLP

(57) ABSTRACT

During shooting, first encoded image data based on image data obtained by performing a simplified development process on RAW image data is recorded together with a RAW image, and afterward, second encoded image data based on image data obtained by performing a high-quality development process on the RAW image data is generated and recorded. By estimating the data amount of the second encoded image data during shooting and reflecting an area based on this data amount on management information of the recording medium as an area for recording the second encoded image data, the area in the recording medium is ensured.

22 Claims, 14 Drawing Sheets

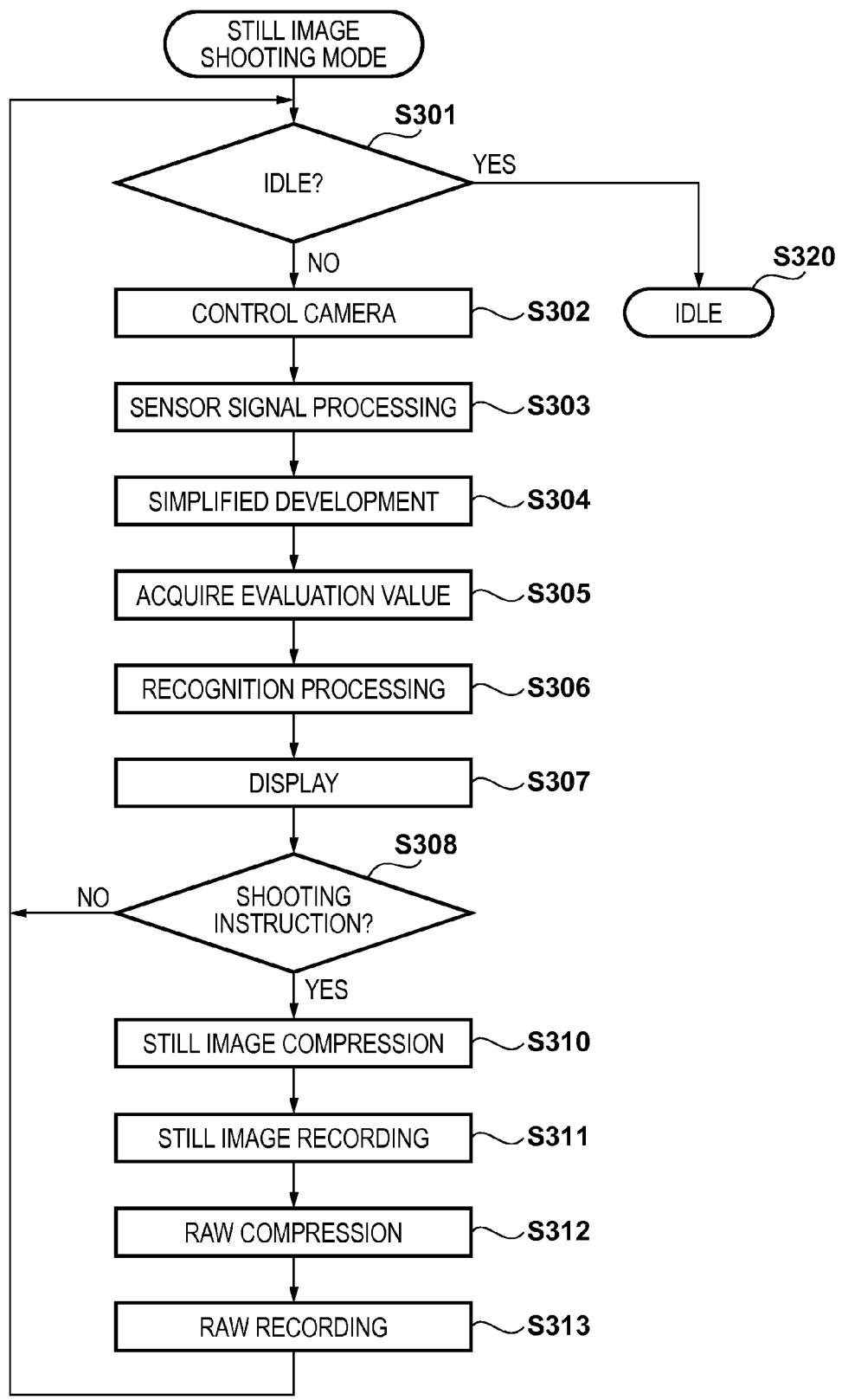

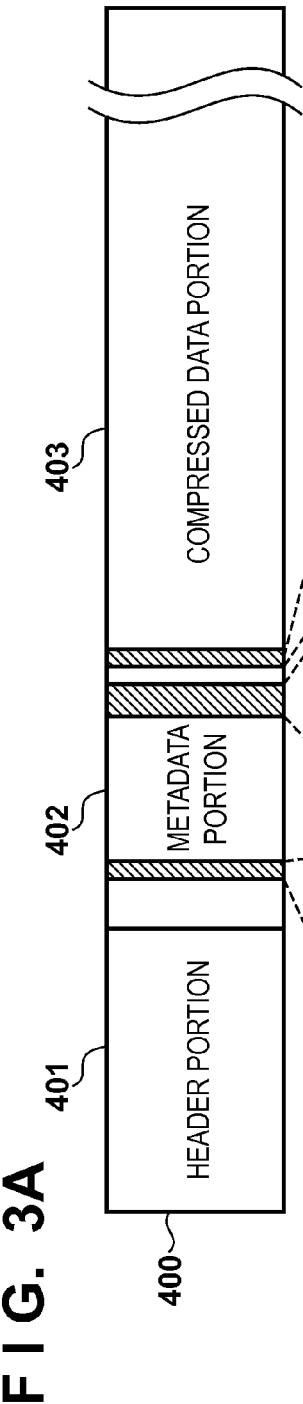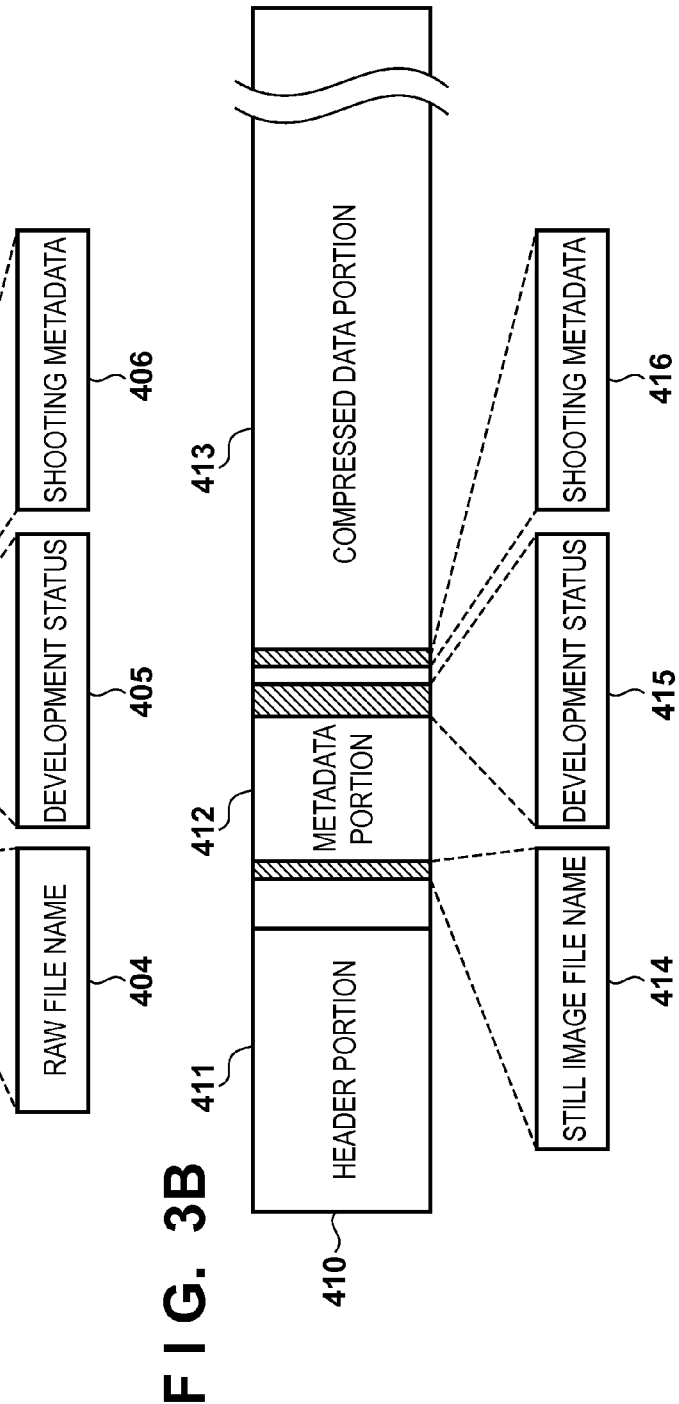

FIG. 6A
| FILE NAME | START ADDRESS | SIZE |
|---|---|---|
| RAW_0 | 0x0000 | 0x100 |
| RAW_1 | 0x0100 | 0x100 |
| ... | ... | ... |
| RAW_N | 0x0f00 | 0x100 |
| JPEG_0_0 | 0x1000 | 0x10 |
| JPEG_0_1 | 0x1010 | 0x10 |
| ... | ... | ... |
| JPEG_0_N | 0x10f0 | 0x10 |
| Reserve | 0x1800 | 0xc00 |
700, 701, 702, 703
FIG. 6B
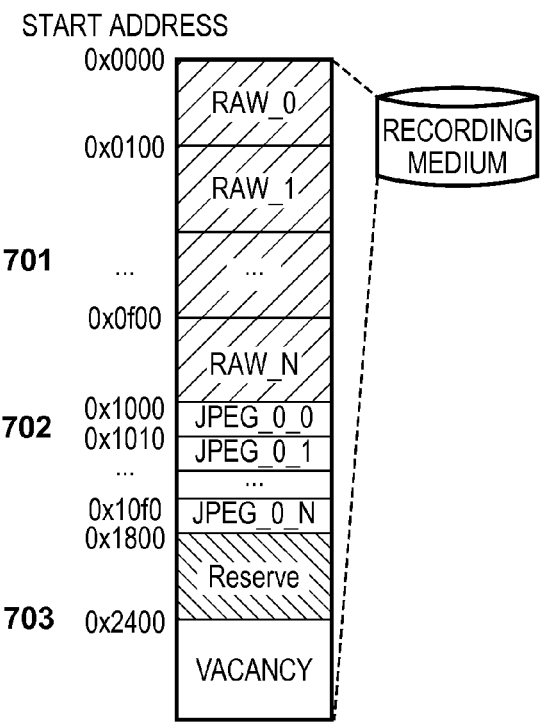
FIG. 6C
| FILE NAME | START ADDRESS | SIZE |
|---|---|---|
| RAW_0 | 0x0000 | 0x100 |
| RAW_1 | 0x0100 | 0x100 |
| ... | ... | ... |
| RAW_N | 0x0f00 | 0x100 |
| JPEG_1_0 | 0x1000 | 0x40 |
| JPEG_1_1 | 0x1040 | 0x40 |
| ... | ... | ... |
| JPEG_1_N | 0x13c0 | 0x40 |
| Reserve | 0x2200 | 0x80 |
710, 711, 712, 713
FIG. 6D
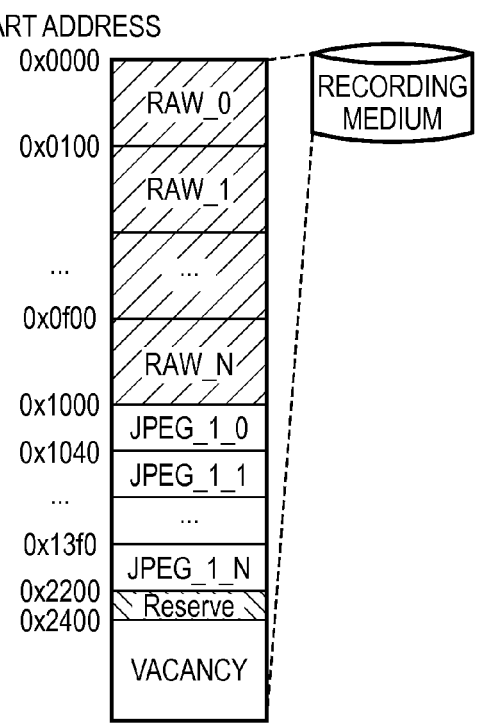

FIG. 10

| FILE NAME | ESTIMATED DATA AMOUNT 1201 | PREVIOUS DIFFERENCE DATA AMOUNT 1205 | MODIFIED ESTIMATED DATA AMOUNT 1202 | GENERATED DATA AMOUNT 1203 | DIFFERENCE DATA AMOUNT 1204 |
|---|---|---|---|---|---|
| JPEG_0_1 | 0x300 | 0x00 | 0x300 | 0x280 | 0x80 |
| JPEG_0_2 | 0x300 | 0x80 | 0x380 | 0x400 | −0x80 |
| JPEG_0_3 | 0x300 | −0x80 | 0x280 | 0x280 | 0x00 |
| JPEG_0_4 | 0x300 | 0x00 | 0x300 | 0x2C0 | 0x40 |
| JPEG_0_5 | 0x300 | 0x40 | 0x340 | 0x380 | −0x40 |
| JPEG_0_5_REDO | 0x300 | 0x40 | 0x340 | 0x320 | 0x20 |

FIG. 11A
| FILE NAME | START ADDRESS | SIZE |
|---|---|---|
| RAW_0 | 0x0000 | 0x100 |
| RAW_1 | 0x0100 | 0x100 |
| ... | ... | ... |
| RAW_N | 0x0f00 | 0x100 |
| JPEG_0_0 | 0x1000 | 0x10 |
| JPEG_0_1 | 0x1010 | 0x10 |
| ... | ... | ... |
| JPEG_0_N | 0x10f0 | 0x10 |
| Reserve | 0x1100 | 0x1300 |
1300, 1301, 1302, 1303
FIG. 11B
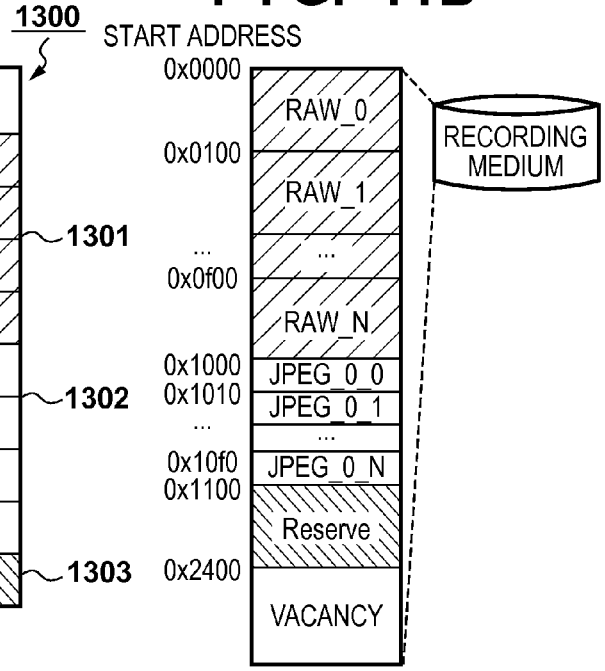
FIG. 11C
| FILE NAME | START ADDRESS | SIZE |
|---|---|---|
| RAW_0 | 0x0000 | 0x100 |
| RAW_1 | 0x0100 | 0x100 |
| ... | ... | ... |
| RAW_N | 0x0f00 | 0x100 |
| JPEG_0_0 | 0x1000 | 0x10 |
| JPEG_0_1 | 0x1010 | 0x10 |
| ... | ... | ... |
| JPEG_0_N | 0x10f0 | 0x10 |
| JPEG_1_0 | 0x1100 | 0x80 |
| JPEG_1_1 | 0x1180 | 0x80 |
| ... | ... | ... |
| JPEG_1_N | 0x2280 | 0x80 |
| Reserve | 0x2300 | 0x100 |
1310, 1311, 1312, 1313, 1314
FIG. 11D
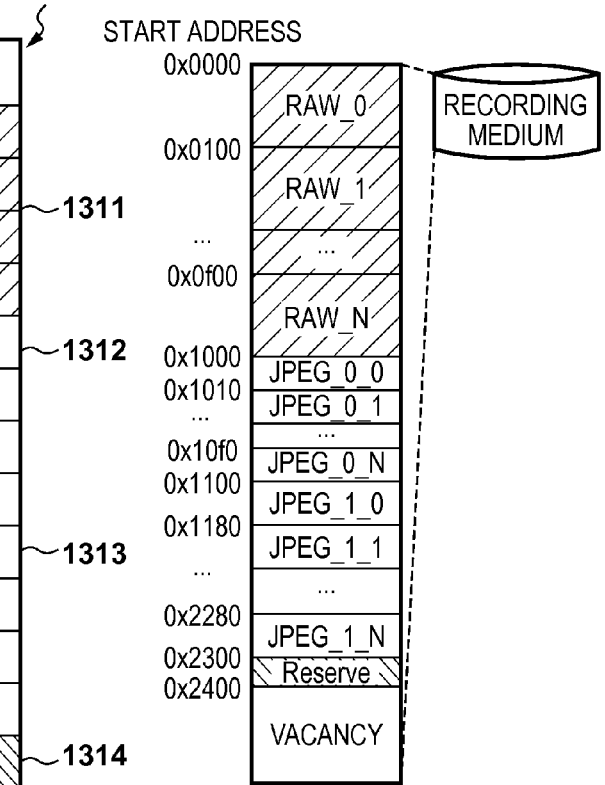

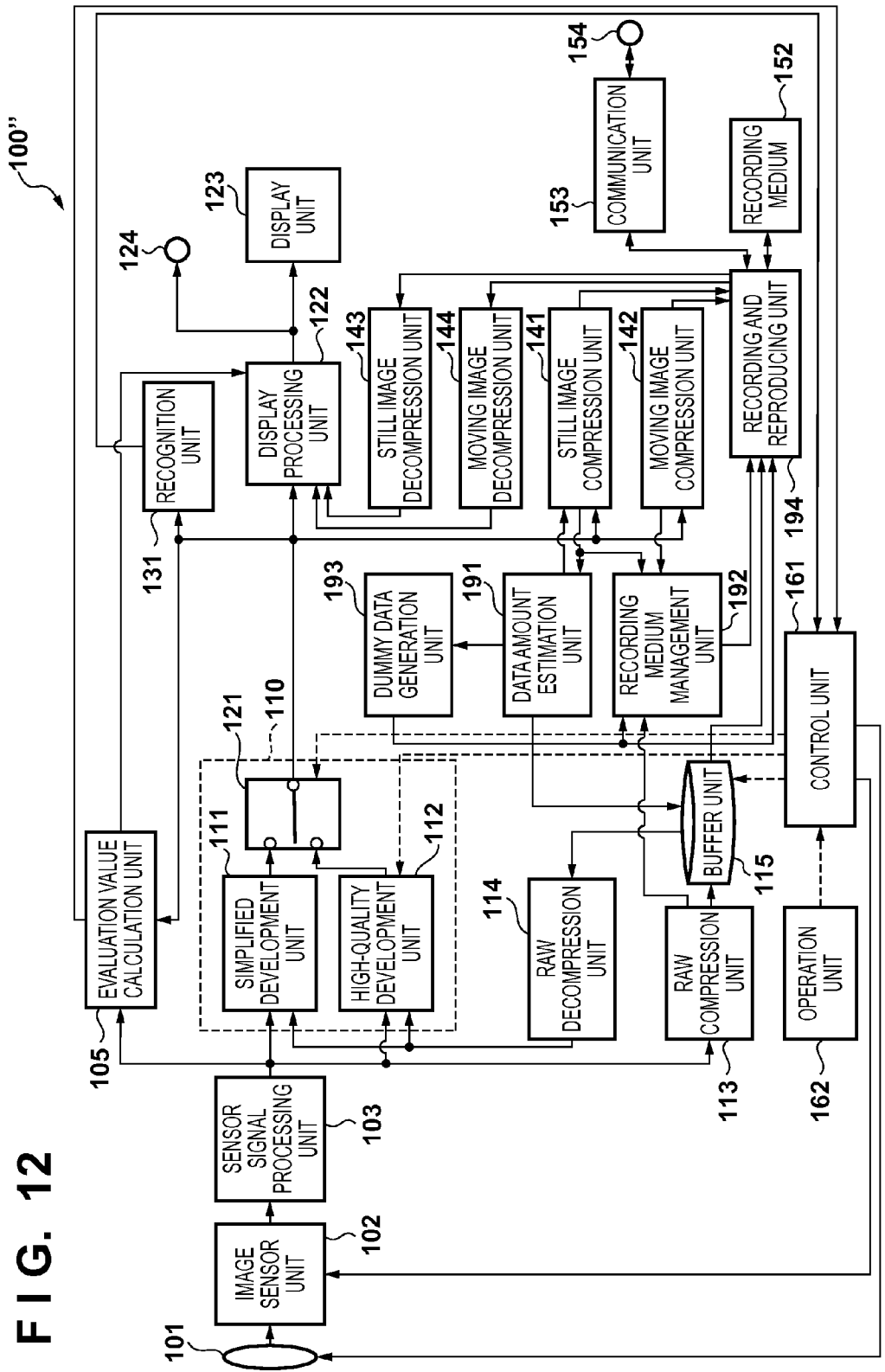
F I G. 12

FIG. 13A
1500
| FILE NAME | START ADDRESS | SIZE |
|---|---|---|
| RAW_0 | 0x0000 | 0x100 |
| RAW_1 | 0x0100 | 0x100 |
| ... | ... | ... |
| RAW_N | 0x0f00 | 0x100 |
| JPEG_0_0 | 0x1000 | 0x10 |
| JPEG_0_1 | 0x1010 | 0x10 |
| ... | ... | ... |
| JPEG_0_N | 0x10f0 | 0x10 |
| Dummy | 0x1100 | 0x1300 |
1501
1502
1503
FIG. 13B
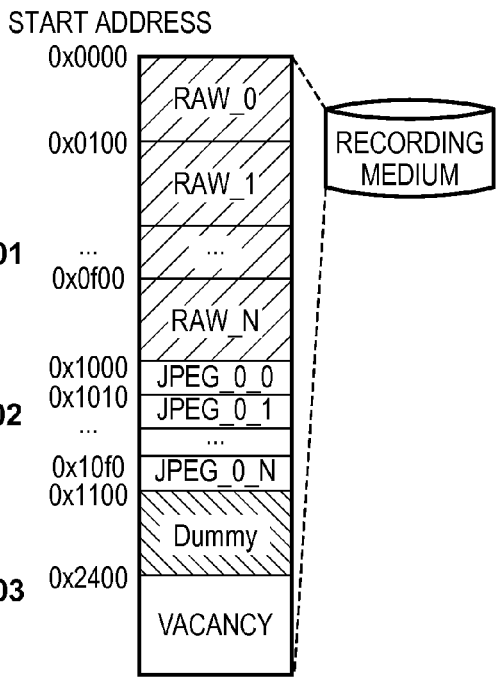
FIG. 13C
1510
| FILE NAME | START ADDRESS | SIZE |
|---|---|---|
| RAW_0 | 0x0000 | 0x100 |
| RAW_1 | 0x0100 | 0x100 |
| ... | ... | ... |
| RAW_N | 0x0f00 | 0x100 |
| JPEG_0_0 | 0x1000 | 0x10 |
| JPEG_0_1 | 0x1010 | 0x10 |
| ... | ... | ... |
| JPEG_0_N | 0x10f0 | 0x10 |
| JPEG_1_0 | 0x1100 | 0x80 |
| JPEG_1_1 | 0x1180 | 0x80 |
| ... | ... | ... |
| JPEG_1_N | 0x2280 | 0x80 |
| Dummy | 0x2300 | 0x100 |
1511
1512
1513
1514
FIG. 13D
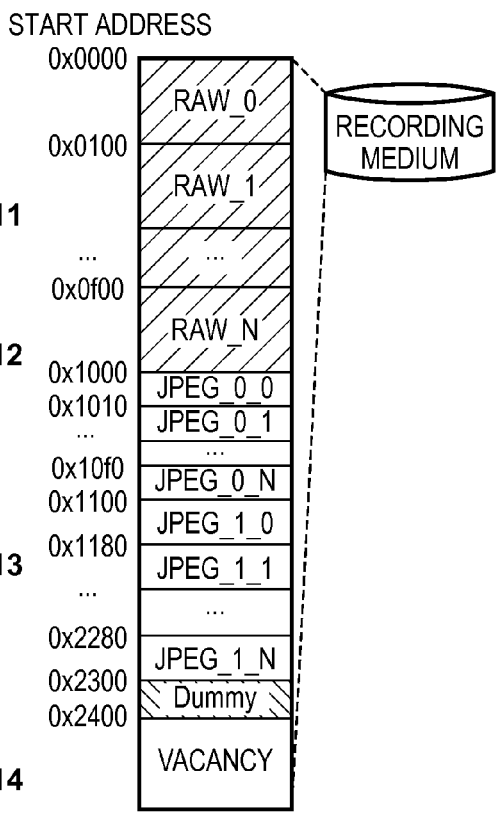

F I G. 14
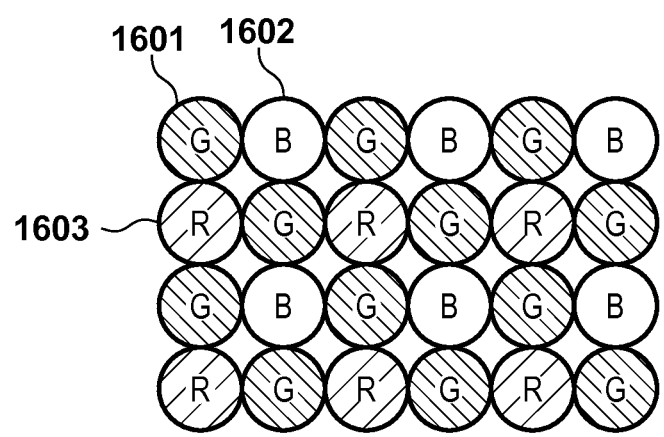

IMAGING APPARATUS AND CONTROL METHOD THEREOF

BACKGROUND OF THE INVENTION

1. Field of the Invention

The present invention relates to an imaging apparatus and a control method thereof.

2. Description of the Related Art

Conventionally, an imaging apparatus using a single-panel color image sensor generally applies the so-called development process to image information (RAW image) obtained by an image sensor, and performs compression encoding on the developed luminance signal and color difference signal, and records the encoded signals in a JPEG format in a recording medium. The development process includes, but is not limited to a demosaicing for performing color interpolation on each pixel to generate a signal composed of a luminance and a color difference, noise reduction on the signal, white balancing, optical distortion correction, and image adjustment.

Meanwhile, there are imaging apparatuses capable of recording RAW images (Japanese Patent Laid-Open No. 2011-244423). As compared with JPEG format or the like, a RAW image requires an enormous amount of data for recording, but is advantageous in that it allows flexible post editing, while minimizing deterioration in image quality.

Since the RAW image has been originally used only within imaging apparatuses, the manufacturers of the imaging apparatuses have their own proprietary formats, which are not compatible with one another. For this reason, in order to be able to check an image with a commonly used apparatus, the RAW image needs to be developed to generate an image in a general-purpose format such as JPEG. However, in recent years, the number of pixels of image sensors has increased, and along with this, the throughput necessary for the development process has been increased. Accordingly, a circuit for high-speed processing is required to perform the development process in real time in parallel with shooting, leading to an increase in the circuit scale and the power consumption.

On the other hand, it is conceivable to record only a RAW image and perform the development process when needed to reproduce the image. However, as described above, there is the problem that the RAW image is not versatile and thus cannot be developed by an apparatus of a different manufacturer, for example.

SUMMARY OF THE INVENTION

The present invention provides an imaging apparatus capable of recording an RAW image without the need of a circuit for performing a high-speed development process and in such a manner that the RAW image can be easily reproduced when necessary, and a control method thereof.

According to an aspect of the present invention, there is provided an imaging apparatus comprising: an imaging unit; an image processing unit configured to acquire RAW image data by using image data obtained by the imaging unit; a development unit configured to perform a development process on the RAW image data by using a first development process and a second development process, wherein the second development process is for obtaining an image having higher quality than that obtained by the first development process; an encoding unit configured to encode image data output from the development unit; an estimation unit configured to, based on one of: (i) a data amount of the RAW image data; and (ii) a data amount of first encoded image data obtained by encoding first image data with the encoding unit, wherein the first image data is generated by applying the first development process on the RAW image data, estimate a data amount of second encoded image data to be obtained by the encoding second image data with the encoding unit, wherein the second image data is generated by applying the second development process on the RAW image data; a recording unit configured to record data in a recording medium; and a control unit configured to control the recording unit to record the RAW image data and the first encoded image data in the recording medium in response to a recording instruction, wherein the control unit ensures a recording area for the second encoded image data in the recording medium based on the estimated data amount of the second encoded image data estimated by the estimation unit, and the encoding unit controls the data amount of the second encoded image data based on the estimated data amount, and the control unit controls the recording unit to record the second encoded image data in the ensured recording area.

According to another aspect of the present invention, there is provided an imaging apparatus comprising: an imaging unit; an image processing unit configured to acquire RAW image data by using image data obtained by the imaging unit; a development unit configured to perform a development process on the RAW image data; an encoding unit configured to encode image data output from the development unit; an estimation unit configured to, based on one of: (i) a data amount of the RAW image data; and (ii) a data amount of first encoded image data obtained by encoding first image data with the encoding unit, wherein the first image data is generated by applying the development process on image data obtained by reducing a quantity of pixels of the RAW image data, estimate a data amount of second encoded image data obtained by the encoding second image data with the encoding unit, wherein the second image data is generated by applying the development process on the RAW image data; a recording unit configured to record data in a recording medium; and a control unit configured to control the recording unit to record the RAW image data and the first encoded image data in the recording medium in response to a recording instruction, wherein the control unit ensures a recording area for the second encoded image data in the recording medium based on the estimated data amount of the second encoded image data estimated by the estimation unit, and the encoding unit controls the data amount of the second encoded image data based on the estimated data amount, and the control unit controls the recording unit to record the second encoded image data in the ensured recording area.

According to a further aspect of the present invention, there is provided a control method of an imaging apparatus, wherein the imaging apparatus comprises: an imaging unit; an image processing unit configured to acquire RAW image data by using image data obtained by the imaging unit; a development unit configured to perform a development process on the RAW image data by using a first development process and a second development process, wherein the second development process is for obtaining an image having higher quality than that obtained by the first development process; an encoding unit configured to encode image data output from the development unit; and a recording unit configured to record data in a recording medium, the control method comprising: a step of estimating, based on one of: (i) a data amount of the RAW image data; and (ii) a data amount of first encoded image data obtained by encoding first image data with the encoding unit, wherein the first image data is generated by applying the first development process on the RAW image data, a data amount of second encoded image data obtained by encoding second image data with the encoding unit, wherein the second image data is generated by applying the second development process on the RAW image data; a step of controlling the recording unit to record the RAW image data and the first encoded image data in the recording medium in response to a recording instruction; a step of ensuring a recording area for the second encoded image data in the recording medium based on the estimated data amount of the second encoded image data estimated in the step of estimating; a step of controlling the data amount of the second encoded image data based on the estimated data amount; and a step of controlling the recording unit to record the second encoded image data in the ensured recording area.

According to yet another aspect of the present invention, there is provided a control method of an imaging apparatus, wherein the imaging apparatus comprises: an imaging unit; an image processing unit configured to acquire RAW image data by using image data obtained by the imaging unit; a development unit configured to perform a development process on the RAW image data; an encoding unit configured to encode image data output from the development unit; and a recording unit configured to record data in a recording medium, the control method comprising: a step of estimating, based on one of: (i) a data amount of the RAW image data; and (ii) a data amount of first encoded image data obtained by encoding first image data with the encoding unit, wherein the first image data is generated by applying the development process on image data obtained by reducing a quantity of pixels of the RAW image data, a data amount of second encoded image data obtained by the encoding second image data with the encoding unit, wherein the second image data is generated by applying the development process on the RAW image data; a step of controlling the recording unit to record the RAW image data and the first encoded image data in the recording medium in response to a recording instruction; a step of ensuring a recording area for the second encoded image data in the recording medium based on the estimated data amount of the second encoded image data estimated in the step of estimating; a step of controlling the data amount of the second encoded image data based on the estimated data amount; and a step of controlling the recording unit to record the second encoded image data in the ensured recording area.

Further features of the present invention will become apparent from the following description of exemplary embodiments with reference to the attached drawings.

BRIEF DESCRIPTION OF THE DRAWINGS

FIG. 2 is a flowchart illustrating operations in a still image shooting mode of the imaging apparatus according to an embodiment.

FIGS. 3A and 3B are diagrams showing exemplary configurations of a still image file and a RAW file in an embodiment.

FIGS. 6A to 6D are diagrams showing an exemplary relationship between management information and a file arrangement on a recording medium before and after a post development process in the imaging apparatus according to the first embodiment.

FIG. 10 is a diagram illustrating an example of a method for modifying an estimated data amount performed by the still image compression unit in the third embodiment.

FIGS. 11A to 11D are diagrams showing an exemplary relationship between management information and a file arrangement on a recording medium before and after a post development process in an imaging apparatus according to a fourth embodiment.

FIG. 12 is a block diagram showing an exemplary configuration of an imaging apparatus according to a fifth embodiment.

FIGS. 13A to 13D are diagrams showing an exemplary relationship between management information and a file arrangement on a recording medium before and after a post development process in the imaging apparatus according to the fifth embodiment.

FIG. 14 is a diagram showing an example of a pixel pattern in an image sensor unit of the imaging apparatus according to an embodiment.

DESCRIPTION OF THE EMBODIMENTS

Exemplary embodiments of the present invention will now be described in detail in accordance with the accompanying drawings.

First Embodiment

Figure 1:
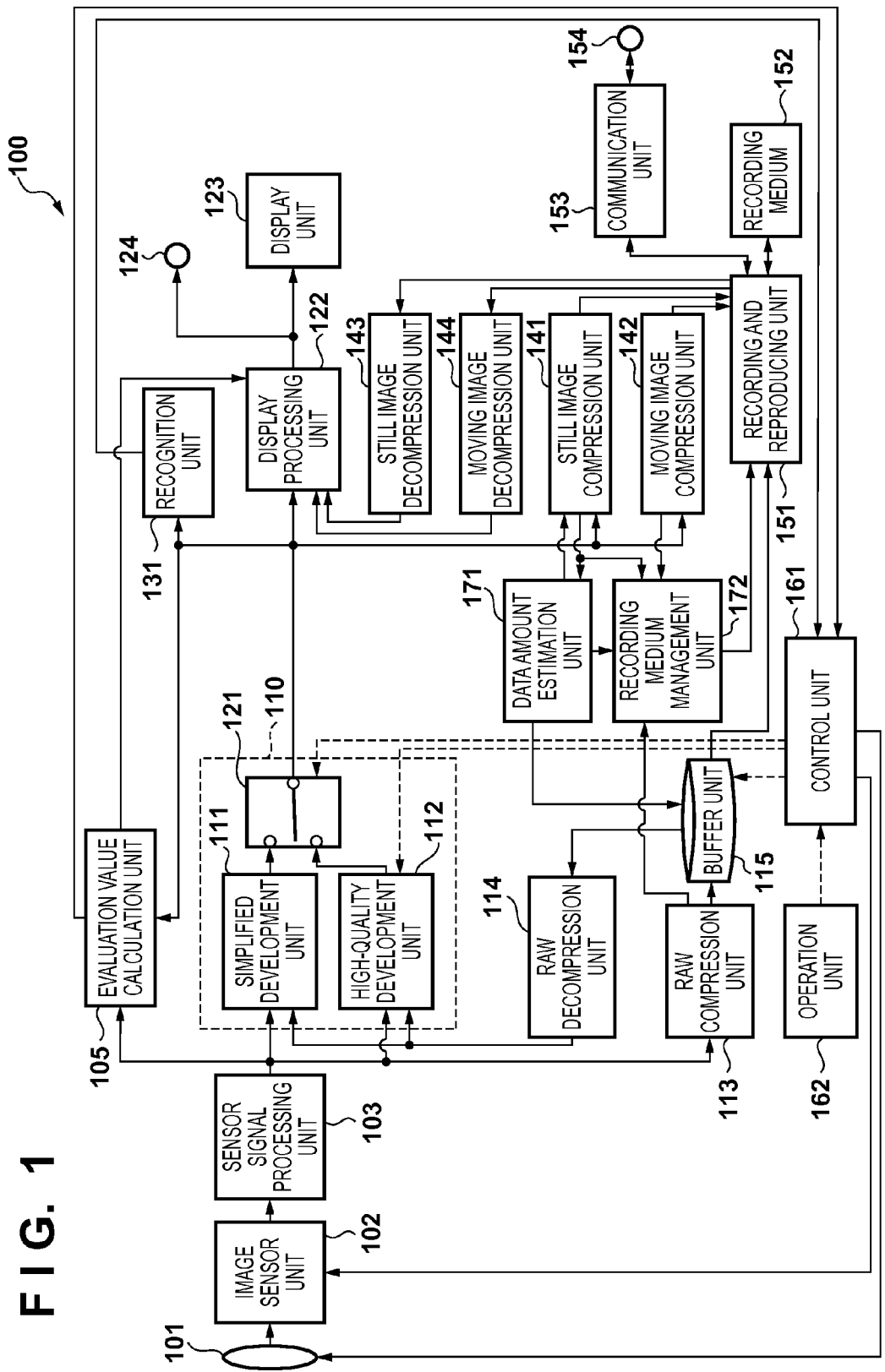
FIG. 1 is a block diagram showing an exemplary configuration of an imaging apparatus according to a first embodiment.

FIG. 1 is a block diagram showing an exemplary functional configuration of an imaging apparatus according to an embodiment of the present invention. These functional blocks may be implemented by dedicated hardware such as an ASIC, or may be implemented through software by a general-purpose processor such as an MPU executing a program.

An imaging apparatus 100 shown in FIG. 1 has not only the function of recording image data obtained by imaging a subject image in a recording medium, but also the function of reproducing the image data from the recording medium, and developing and displaying the image data, and the function of sending and receiving the image data to and from an external apparatus, a server (cloud) or the like. Therefore, the imaging apparatus according to the embodiment of the present invention can be represented as an image processing apparatus, a recording apparatus, a reproducing apparatus, a recording and reproducing apparatus, a communication apparatus, or the like.

Referring to FIG. 1, a control unit 161 includes a programmable processor such as a CPU or an MPU and a non-volatile memory storing a control program executed by the programmable processor, and controls the overall processing of the imaging apparatus 100. Note that a signal line for performing control and communication is connected from the control unit 161 to each of the various functional blocks although only a part thereof is shown in FIG. 1 in order to avoid the complexity of illustration. An operation unit 162 includes an input device, such as a key, a button, or a touch panel, that is used by the user to provide an instruction to the imaging apparatus 100. An operation signal from the operation unit 162 is detected by the control unit 161, and the control unit 161 controls other functional blocks or the like such that an operation in accordance with the detected operation is performed. A display unit 123 displays an image that is provided through a display processing unit 122, including, for example, an image shot or reproduced by the imaging apparatus 100, a menu screen, a various types of information, and the like. The display unit 123 includes, for example, a Liquid Crystal Display (LCD) or the like.

A subject image that is to be imaged is imaged on an image sensor unit 102 via an imaging optical unit 101. In response to a recording start instruction provided by the operation unit 162, the control unit 161 starts an operation of recording a shot image (moving image or still image). Note that it is possible to adopt a configuration in which moving image shooting is performed in order to achieve a live-view display during standby for recording. The operations of the imaging optical unit 101 and the image sensor unit 102 are controlled by the control unit 161 on the basis of results of calculating evaluation values, including, for example, an aperture, focus, camera shake, and the like acquired by an evaluation value calculation unit 105, and subject information from a recognition unit 131.

The image sensor unit 102 may be, for example, a CCD image sensor or CMOS image sensor that converts light transmitted through a color filter of red, green, and blue (RGB) disposed for each pixel into an electric signal. FIG. 14 illustrates an example of a color filter disposed in the image sensor unit 102, showing a pixel pattern in an image handled by the imaging apparatus 100. As shown in FIG. 14, red (R) 1603, green (G) 1601, and blue (B) 1602 are arranged in a mosaic pattern for each pixel. The color filter has a structure in which sets of pixels are regularly arranged, with each set being composed of 4 pixels, namely, 2 pixels horizontally×2 pixels vertically, including one red pixel, one blue pixel, and two green pixels. Such an array of color filters is usually called the primary color Bayer pattern. The image sensor unit 102 of the present embodiment has the capability of outputting image data for 8000 pixels wide× 4000 pixels high at 60 frames per second. Note that the colors and pattern constituting the color filter are not limited to those of the primary color Bayer pattern, and it is possible to adopt any other pattern.

The electric signal converted by the image sensor unit 102 is subjected to a pixel restoration process by a sensor signal processing unit 103. The restoration process includes processing of interpolating pixels to be restored by using the values of surrounding pixels or processing of subtracting a predetermined offset value for the values of missing pixels or pixels with low reliability in the image sensor unit 102. In the present embodiment, image data that is output from the sensor signal processing unit 103 is referred to as RAW image data, which means an image that has not been developed.

The RAW image data output from the sensor signal processing unit 103 is developed by a development unit 110. The development unit 110 includes a plurality of (in the present embodiment, two) different development processing units, which have different levels of the processing accuracy and different priorities of the processing load. In the present embodiment, the development unit 110 is composed of a simplified development unit 111 that performs a first development process and a high-quality development unit 112 that performs a second development process, and includes a switch unit 121 that selects between the outputs therefrom. The simplified development unit 111 and the high-quality development unit 112 both perform, on the RAW image data, a development process such as debayering (also called demosaicing or color interpolation), white balance adjustment, RGB to YUV conversion, noise reduction, and optical distortion correction. Note that these are examples of the processing included in the development process, and it is not intended to mean that all of them are essential for the development process. Other processing may also be included or a part of the above-mentioned processing may not be included in the development process.

The high-quality development unit 112 performs various types of processing with higher precision than the simplified development unit 111. Due to the higher precision, the high-quality development unit 112 provides a developed image having higher image quality that can be obtained by the simplified development unit 111, but requires a large processing load at the same time. On the other hand, the simplified development unit 111 reduces the number of pixels on one screen (or one picture) of the RAW image data to 2000 pixels wide×1000 pixels high. Furthermore, due to the lower processing precision than that of the high-quality development unit 112, the simplified development unit 111 can perform the development process at high speed during shooting, although the obtained image quality is lower than that obtained by the high-quality development unit 112. For example, the simplified development unit 111 uses a smaller number of taps in the filters used for debayering or other correction processing than that used by the high-quality development unit 112. In this way, the simplified development unit 111 is configured to process image data having a smaller number of pixels than that of the RAW image data, and also to perform the processing in a simplified manner, thus reducing the throughput. Since the processing load of the simplified development unit 111 is small, the simplified development unit 111 is used for real-time development performed in parallel with a shooting operation. The switch unit 121 is switched by the control unit 161 in accordance with the operation content instructed through the operation unit 162 by the user or the control corresponding to the operating mode being executed.

Although the present embodiment illustrates a configuration in which the simplified development unit 111 and the high-quality development unit 112 exist independently within the development unit 110, it is possible to adopt a configuration in which a single development unit switches the operating modes so as to perform the simplified development and the high-quality development exclusively. Further, it is sufficient that the plurality of development units have processing loads that are different from one another, and it is not essential to lower both the size of the image to be processed and the processing accuracy. For example, the plurality of development units may include development units having the same number of pixels to be processed, but different levels of processing accuracy, or development units having the same level of processing accuracy, but different numbers of pixels to be processed. However, the plurality of development units need to include at least one development unit capable of completing the development process of the shot image until the start of shooting the next image.

Although FIG. 1 shows the RAW image data from the sensor signal processing unit 103 as being input to the simplified development unit 111 and the high-quality development unit 112 within the development unit 110, this does not mean that the development process for the same RAW image data is performed by both of the development units. In terms of the processing load, basically, only a single development unit performs the development process. Accordingly, the switch unit 121 may be provided so as to switch the development unit to which the RAW image data is input.

The image data developed by the development unit 110 is subjected to predetermined processing performed by the display processing unit 122, and is thereafter displayed in the display unit 123. Alternatively, the developed image data may be output through an image output terminal 124 to a display device connected outside. The image output terminal 124 includes, for example, a general-purpose interface such as HDMI (registered trademark) or SDI.

The image data developed by the development unit 110 is also supplied to the evaluation value calculation unit 105. The evaluation value calculation unit 105 calculates, from the image data, evaluation values such as a focus state and an exposure state, for example. These evaluation values are used, for example, for auto focus detection and auto exposure control performed by the control unit 161.

The image data developed by the development unit 110 is also supplied to the recognition unit 131. The recognition unit 131 has the function of detecting and recognizing subject information contained in the image data. For example, the recognition unit 131 detects a person's face contained in the image represented by the image data, and outputs information indicating the position and the size of the face if the face is detected. The recognition unit 131 may also perform, for example, authentication of a specific person based on feature information such as that of the face.

The image data developed by the development unit 110 is also supplied to a still image compression unit 141 and a moving image compression unit 142. The still image compression unit 141 is used in the case of compressing the image data as a still image. The still image compression unit 141 encodes still image data in accordance with a known encoding scheme such as JPEG. The moving image compression unit 142 is used in the case of compressing the image data as a moving image. The moving image compression unit 142 encodes moving image data in accordance with a known encoding scheme such as H.264 or H.265. Each of the still image compression unit 141 and the moving image compression unit 142 performs high-efficiency encoding (compression encoding) on the target image data to generate image data whose information amount has been compressed, and sends that image data to a recording and reproducing unit 151. The still image compression unit 141 and the moving image compression unit 142 notify the data amount of the compressed still image data or the moving image data to a recording medium management unit 172.

When the still image compression unit 141 has compressed the still image data from the simplified development unit 111, it notifies the data amount of the compressed still image to a data amount estimation unit 171. The data amount estimation unit 171 estimates the data amount in the case where the RAW image data corresponding to the still image data that has been subjected to the simplified development is developed (here, developed by using the high-quality development unit 112) with better quality than during recording, and is compressed by the still image compression unit 141. The details of the operations of the data amount estimation unit 171 will be described later.

The data amount estimation unit 171 notifies the estimated data amount to the recording medium management unit 172 and the still image compression unit 141. Alternatively, the data amount estimation unit 171 can hold the estimated data amount, for example, in the buffer unit 115 until the RAW image data is developed by the high-quality development unit 112 and is encoded by the still image compression unit 141. When encoding the output from the high-quality development unit 112, the still image compression unit 141 can perform encoding according to the data amount notified from the data amount estimation unit 171. The details of this will be described later.

The RAW compression unit 113 applies wavelet transform, differential encoding, and the like to the RAW image data output from the sensor signal processing unit 103 to generate compressed RAW data whose data amount has been reduced. The RAW compression unit 113 stores the compressed RAW data in the buffer unit 115. The buffer unit 115 may be any storage device, including, for example, a memory such as a flash memory or DRAM, or an HDD. In addition, the RAW compression unit 113 notifies the data amount of the compressed RAW data to the recording medium management unit 172. The compressed RAW data may be saved in the buffer unit 115, or may be moved further to a different recording medium after being stored, and be deleted from the buffer unit 115.

The recording and reproducing unit 151 records the still image data from the still image compression unit 141 and the moving image data from the moving image compression unit 142 in a recording medium 152. The recording and reproducing unit 151 records the RAW data of the still image and the RAW data of the moving image data read out from the buffer unit 115 in the recording medium 152 as a RAW file separate from the still image data compressed by the still image compression unit 141 and the moving image data compressed by the moving image compression unit 142. The recording and reproducing unit 151 manages the data recorded in the recording medium 152 as a file in accordance with a known file system such as FAT. The recording medium 152 is, for example, a built-in memory or hard disk having a large capacity, or a removable memory card or the like. The recording and reproducing unit 151 can also read out a still image file, a moving image file, and a RAW file (still image, moving image) from the recording medium 152. The recording and reproducing unit 151 can write or read out various data files into and from an external storage or server via a communication unit 153. The communication unit 153 provides the imaging apparatus 100 with an access to a computer network or an external device by wireless communication or wired communication through a communication terminal 154.

The recording medium management unit 172 generates management information for managing the recording area for a file recorded in the recording medium 152 by the recording and reproducing unit 151. In addition, the recording medium management unit 172 updates the management information by using the data amount of the RAW image data, still image data or moving image data notified from the still image compression unit 141 or the moving image compression unit 142, and the estimated data amount from the data amount estimation unit 171, and manages the recording area in the recording medium 152. Then, the recording medium management unit 172 notifies the recording address of each file in the recording medium 152 to the recording and reproducing unit 151.

The recording and reproducing unit 151 acquires the desired file from the recording medium 152, or via the communication unit 153 and reproduces it. If the file to be reproduced is a RAW file, the recording and reproducing unit 151 stores the acquired RAW file in the buffer unit 115.

If the file to be reproduced is a still image file, the recording and reproducing unit 151 supplies the acquired still image file to the still image decompression unit 143. If the file to be reproduced is a moving image file, the recording and reproducing unit 151 supplies the acquired moving image file to the moving image decompression unit 144.

The RAW decompression unit 114 reads out the RAW file stored in the buffer unit 115, and decodes and decompresses the compressed RAW data. The RAW data decompressed by the RAW decompression unit 114 is supplied to the simplified development unit 111 and the high-quality development unit 112 of the development unit 110.

The still image decompression unit 143 decodes and decompresses the input still image file, and supplies the decompressed still image file as the reproduced image of the still image to the display processing unit 122. The moving image decompression unit 144 decodes and decompresses the input moving image file, and supplies the decompressed moving image file as the reproduced image of the moving image to the display processing unit 122. The still image and moving image processed by the display processing unit 122 are displayed by the display unit 123.

Next is a description of the operations in a shooting mode of the imaging apparatus 100 with reference to the flowchart shown in FIG. 2. Unless otherwise specified, the flowchart in FIG. 2 illustrates the procedure of the processing implemented by the control unit 161 controlling the functional blocks shown in FIG. 1. Specifically, the processing is implemented by a program stored in a non-volatile memory included in the control unit 161 being expanded into a memory (RAM) and executed by the CPU.

The control unit 161 determines whether the processing load state of the imaging apparatus 100 is low (S301), and transitions to the idle state according to the load state (S320); otherwise it proceeds to S302. The load state can be determined according to the operating ratio of the CPU included in the control unit 161, or whether a pre-defined high-load operation, including, for example, a rapid continuous shooting operation, is being performed, but the present invention is not limited thereto. If the processing load is not low enough to transition to the idle state, the control unit 161 advances the processing to S302. Note that the determination as to whether to transition to the idle state will be described later.

At S302, the control unit 161 controls the operations of the imaging optical unit 101 and the image sensor unit 102. For example, the control unit 161 causes a zoom lens or a focus lens included in the imaging optical unit 101 to move in accordance with a zoom instruction or a shooting preparation instruction from the user through the operation unit 162, and sets the readout area of the image sensor unit 102 in accordance with an instruction regarding the number of captured pixels. In addition, the control unit 161 implements control of the focus and the tracking for a specific subject on the basis of the information on the evaluation values from the evaluation value calculation unit 105 and subject information from the recognition unit 131. At S302, shooting is performed under a shooting condition in accordance with a predetermined frame period.

At S303, the sensor signal processing unit 103 performs signal processing for pixel restoration on the electric signal converted by the image sensor unit 102. For example, the sensor signal processing unit 103 performs interpolation using the values of surrounding pixels or subtraction of a predetermined offset value on an electric signal corresponding to a missing pixel of an image pickup element and an electric signal of a pixel having low reliability.

At S304, the simplified development unit 111 develops the RAW image data. Note that the control unit 161 controls the state of the switch unit 121 so that the image data developed by the simplified development unit 111 is output from the development unit 110 by the start of S304 at the latest.

The simplified development unit 111 reduces the number of pixels of the RAW image data as described above, thus reducing the image. Then, the simplified development unit 111 performs debayering (demosaicing) on the reduced RAW image data to generate a color signal missing from each pixel, and thereafter converts the color signal into a signal composed of a luminance and a color difference (RGB to YUV conversion). Furthermore, the simplified development unit 111 removes noise contained in each signal, corrects the optical distortion (aberration) of an imaging optical system, and adjusts the white balance. As described above, the simplified development unit 111 performs the development process after reducing the number of pixels, or performs or omits noise removal and optical distortion correction by processing giving priority to the processing speed, thus reducing or removing the limitation on the shooting capacity of the imaging apparatus 100 imposed by the load (processing speed and power consumption) of the development process. With the use of the simplified development unit 111, it is possible to achieve, for example, a rapid continuous shooting speed or a number of continuously shot images that cannot be achieved in the case of using the high-quality development unit 112.

The image data developed by the simplified development unit 111 is supplied to the evaluation value calculation unit 105 through the switch unit 121. The evaluation value calculation unit 105 calculates evaluation values such as those for the focus state of the imaging optical unit 101 and the exposure state of the image from the luminance value and the contrast value that are contained in the image data by a predetermined method (S305). Note that the evaluation value calculation unit 105 may calculate these evaluation values for the RAW image data prior to the development process.

The image data developed by the simplified development unit 111 is also supplied to the recognition unit 131. The recognition unit 131 applies, to the image data, processing of detecting a subject (e.g., a person's face) having a pre-defined specific feature to generate subject information. For example, the recognition unit 131 outputs the presence or absence of a face in the image data, the position and the size of the face, information on the individual identified on the basis of the face, and the like as the subject information (S306).

The image data developed by the simplified development unit 111 is also supplied to the display processing unit 122. The display processing unit 122 forms a display image from the acquired image data, and outputs and displays the display image to the display unit 123 or an external display device (S307). The display image displayed by the display unit 123 is used, for example, for a live-view (through-image) display for the user to appropriately frame the subject in the recording standby state. Furthermore, the display processing unit 122 may display a frame-shaped mark indicating the focus area or the position of the recognized face in the display image in a superimposed manner by utilizing the evaluation values and the subject information supplied from the evaluation value calculation unit 105 and the recognition unit 131.

At S308, the control unit 161 determines whether a shooting instruction to instruct recording of a still image has been input from the user through the operation unit 162. If the shooting instruction has been input, the control unit 161 advances the processing to S310, and if the shooting instruction has not been input, the processing from S301 is repeated.

At S310, in response to the shooting instruction, the control unit 161 controls the imaging optical unit 101 and the image sensor unit 102 to start shooting under a predetermined shooting condition. Here, the operations during shooting of a still image will be described. One screen (or one picture) worth of image data obtained by the image sensor unit 102 is supplied to the development unit 110, developed by the simplified development unit 111, and thereafter supplied to the still image compression unit 141. The still image compression unit 141 performs predetermined encoding processing such as JPEG encoding processing (still image compression) on the supplied image data (S310), thus generating still image data. In the present embodiment, the still image data that is developed by the simplified development unit 111 and is encoded by the still image compression unit 141 during shooting in this manner is referred to as simplified still image data (first encoded image data). Note that the encoding method is not limited to the JPEG scheme, and any encoding method may be used.

At S311, the recording and reproducing unit 151 records a still image file (simplified still image file) containing the simplified still image data in the recording medium 152.

One screen (or one picture) worth of the RAW image data obtained by the image sensor unit 102 and the sensor signal processing unit 103 is supplied further to the RAW compression unit 113. The RAW compression unit 113 applies encoding (RAW compression) processing for reducing the data amount to the RAW image data to convert the RAW image data into compressed RAW image data (S312). The compressed RAW image data is stored in the buffer unit 115. Note that the encoding for the RAW image data may be either reversible or irreversible.

At S313, the recording and reproducing unit 151 reads out the image data from the buffer unit 115, and records a data file (RAW file) in which the (compressed) RAW image data is stored in the recording medium 152.

Note that at least a part of the processing of generating and recording the simplified still image data (S310 to S311) and the processing of compressing and recording the RAW image data (S312 to S313) may be performed in parallel. In addition, at S311 and S313, the recording and reproducing unit 151 may send the still image file and/or the RAW file to an external storage from the communication terminal 154 via the communication unit 153, such that the still image file and/or the RAW file are recorded by the external storage.

Although a description has been given here of a case where the shooting instruction for a still image is provided at S308, basically the same processing may also be applied to a case where a shooting instruction for instructing to start the recording of a moving image has been provided. First, the processing from S301 to S307 is the same. Then, the processing of generating and recording the simplified moving image data may be performed at S310 to S311, and the processing of compressing and recording the RAW data may be performed at S312 to S313.

The simplified moving image data is generated for the moving image data constituted by the RAW image data obtained from the image sensor unit 102 by developing each frame image by the simplified development unit 111 at S310, and encoding the resulting image by the moving image compression unit 142. Then, the recording and reproducing unit 151 records the simplified moving image data at S311.

As for the RAW data, the data resulting from compression of each RAW image frame at S312 is recorded by the recording and reproducing unit 151 through the buffer unit 115 at S313.

Next is a description of the structures of the still image file and the RAW file in the present embodiment. FIGS. 3A and 3B are diagrams showing exemplary configurations of the still image file and the RAW file.

FIG. 3A shows an exemplary structure of the still image file. A still image file 400 is composed of a header portion 401, a metadata portion 402, and a compressed data portion 403. The header portion 401 contains an identification code or the like that indicates that this file is a still image file. The compressed data portion 403 contains compressed data of a still image that has been subjected to high-efficiency encoding.

The metadata portion 402 contains information (e.g., a file name) 404 for specifying the (corresponding) RAW file (the file storing the RAW data from which the still image data stored in the compressed data portion 403 is originated) that has been generated in parallel with this still image file. The metadata portion 402 also contains a development status 405 and shooting metadata 406. The development status 405 is information for determining whether the compressed data stored in this still image file has been subjected to the simplified development. The shooting metadata 406 contains the evaluation values and the subject information obtained by the evaluation value calculation unit 105 and the recognition unit 131, information obtained during shooting (e.g., an aperture value, a shutter speed, sensitivity, lens type identification information, sensor type identification information, etc.) supplied from the imaging optical unit 101 and the image sensor unit 102. Although not shown, the metadata portion 402 may further contain an identification code of the recording medium in which the corresponding RAW file (generated in parallel with the still image file) is recorded, path information of the recording destination, an estimated data amount notified from the data amount estimation unit 171, and the like. These pieces of metadata are sent from the recording medium management unit 172 to the recording and reproducing unit 151 and recorded therein.

As described thus far, the imaging apparatus 100 according to the present embodiment uses the simplified development unit 111 to perform the live-view display and the development process for a still image file generated in response to the recording instruction. In addition, the imaging apparatus 100 according to the present embodiment records the RAW file in response to the recording instruction. No development process is required to record the RAW file.

FIG. 3B shows an exemplary structure of a RAW file 410. The RAW file 410 is recorded in, for example, a predetermined recording area in the recording medium 152 by the recording and reproducing unit 151. The RAW file 410 is composed of a header portion 411, a metadata portion 412, and a compressed data portion 413. The header portion 411 contains an identification code or the like that indicates that this file is in a RAW file format. The compressed data portion 413 contains compressed RAW data of a still image that has been subjected to high-efficiency encoding (or may be non-compressed RAW image data).

The metadata portion 412 contains information (e.g., a file name) 414 for specifying the (corresponding) still image file that has been generated in parallel with this RAW file. The metadata portion 412 also contains a development status 415 indicating that the image data stored in the corresponding still image file has been subjected to the simplified development. The metadata portion 412 also contains shooting metadata 416 that is similar to the shooting metadata 406.

Although not shown, the metadata portion 412 may further contain an identification code of the recording medium or path information of the folder in which the corresponding still image file is recorded, or the like. Alternatively, the corresponding still image file itself may be converted into metadata, and stored in the metadata portion 412. These pieces of metadata are sent from the recording medium management unit 172 to the recording and reproducing unit 151, and recorded therein.

Note that the file structures illustrated in FIGS. 3A and 3B described herein are merely examples, and it is possible to adopt a configuration compliant with a different standard such as EXIF. In addition, the recording of a file into the recording medium 152 may be performed with a file system compliant with DCF, for example.

Next is a description of a post development process in the present embodiment. The post development process is a process of generating high-quality still image/moving image data from the RAW image data and recording the generated data, after completion of the operation of recording the RAW image data and the simplified still image/moving image data during shooting. Specifically, first, the RAW image data recorded in the buffer unit 115, the recording medium 152 or the like is read out, and developed by the high-quality development unit 112. Then, high-quality encoded image data (second encoded image data) is generated in the still image compression unit 141 or the moving image compression unit 142, and the generated image data is recorded in the recording medium 152. Although the post development process is applicable to the RAW image data of a still image and a moving image in the present embodiment, the following description will be given, taking a still image as an example.

As described above, the simplified still image data recorded during recording of a RAW image has been compressed after being developed by the simplified development unit 111. Accordingly, the image quality is inferior (e.g., a smaller number of pixels), as compared with the case where the RAW image has been developed by the high-quality development unit 112. The simplified still image data has a quality sufficient to roughly check the shot content immediately after shooting or to display the shot content in a display device with a small pixel number, such as the display unit 123 of the imaging apparatus 100, but may not have quality sufficient to check the details of the image or to print out the image.

The user may, of course, perform a high-quality development process on the RAW image data as needed, but this requires time and effort. For this reason, in the present embodiment, the post development process is automatically performed when the imaging apparatus 100 is in an idle state. The idle state refers to a state in which the processing load of the imaging apparatus 100 is small, including, for example, a shooting standby time, a standby state during reproduction of a still image, and a sleep state. Note that in addition to being performed automatically, the post development process may be started in accordance with an instruction from the user.

There is no particular limitation on the method for determining whether or not the imaging apparatus 100 is in the idle state, and it is possible to use any determination method, including, for example, a commonly used measurement method for the processing load. For example, the determination may be made based on whether the operating ratio of the CPU included in the control unit 161 is less than a pre-defined threshold, or whether a pre-defined high-load operation such as a rapid continuous shooting operation or recording and reproducing processing is being performed. Alternatively, the imaging apparatus 100 may be unconditionally regarded as being in the idle state if an operating mode in which basically only a low-load process occurs is selected.

Figure 4:
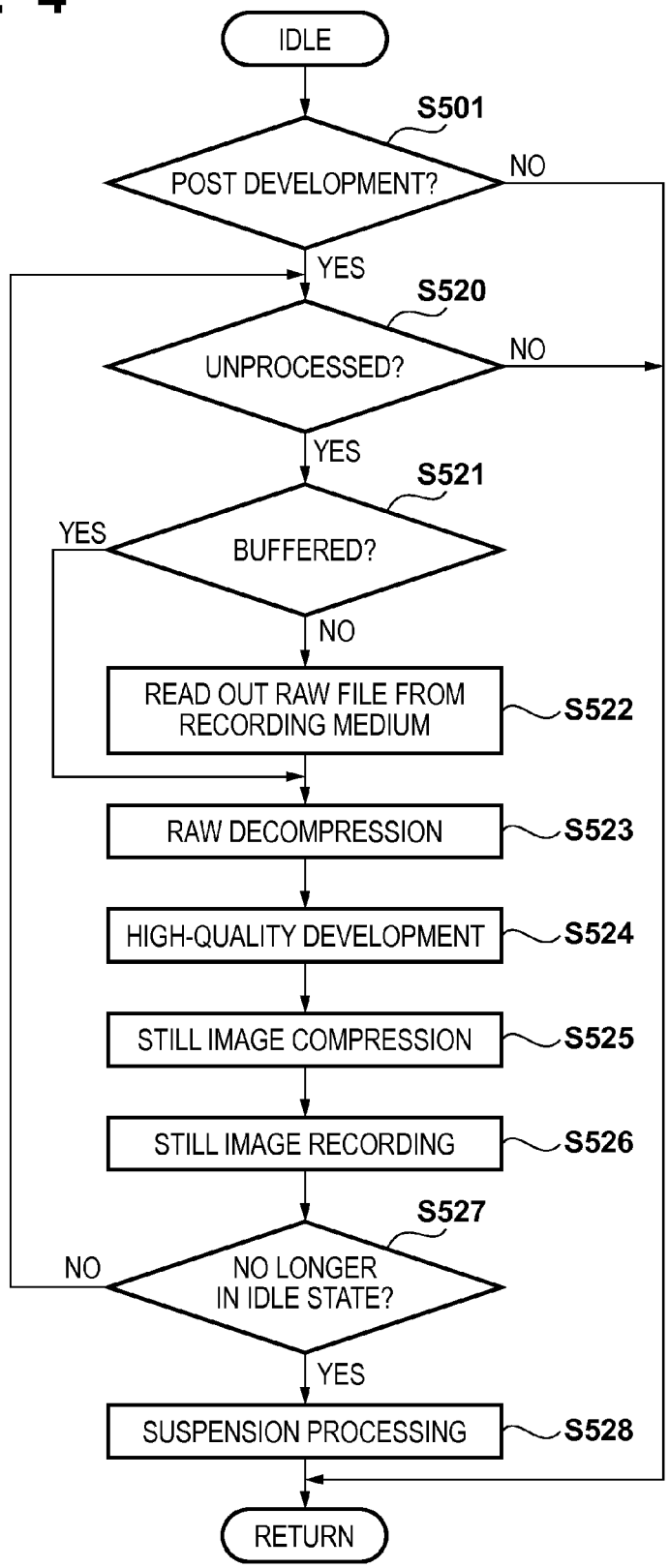
FIG. 4 is a flowchart illustrating operations in an idle state of the imaging apparatus according to an embodiment.

Next is a description of an idle process performed at S320 in FIG. 2, with reference to the flowchart in FIG. 4. Note that the idle process is performed if it is determined that the imaging apparatus 100 is in the idle state not only in the still image shooting mode, but also in other operating modes.

The flowchart in FIG. 4 illustrates the processing procedure executed by the control unit 161 controlling various blocks, and the procedure is executed by a program stored in a memory (ROM) included in the control unit 161 being expanded into another memory (RAM) and executed by the CPU.

Upon start of the idle process in FIG. 4, the control unit 161 determines, based on the user's setting, whether or not to perform the post development process (S501). If the post development process is not to be performed, the control unit 161 ends the idle process, and returns to the original processing, and if the post development process is to be performed, the control unit 161 causes the processing to transition to S520.

In the case of performing the post development process, the control unit 161 determines whether a high-quality still image file has been recorded by the post development process for each RAW file recorded in the recording medium 152 (whether the post development process has been performed) (S520). For example, the control unit 161 refers to the development status 415 in the RAW file 410, and determines that the RAW file has not been subjected to the post development process if the development status 415 contains information indicating that the corresponding still image file has been processed by the simplified development unit 111. Alternatively, the control unit 161 searches for a still image file having the still image file name 414 contained in the metadata portion 412 of the RAW file in the recording medium 152. This is based on the fact that if shooting has been performed in the still image shooting mode, a single still image file and a single RAW file are recorded in association with each other for a single recording instruction in the recording medium 152. Then, the control unit 161 refers to the development status 405 stored in the metadata portion 402 of the found still image file 400. If the development status 405 contains the information indicating that the still image file 400 has been processed by the simplified development unit 111, the control unit 161 determines that the RAW file corresponding to the still image file has not been subjected to the post development process. Alternatively, a table indicating whether or not the post development process has been performed may be separately provided for a series of still images, and the determination may be made by referring to this table.

If all of the RAW files recorded in the recording medium 152 have been subjected to the post development process (S520, NO), the control unit 161 ends the idle process as in the case where the post development process is not performed, and returns to the original processing. On the other hand, if any RAW file that has not been subjected to the post development process is present in the RAW files recorded in the recording medium 152, the control unit 161 causes the processing to transition to S521.

The control unit 161 checks whether the RAW image data corresponding to the RAW file that is recorded in the recording medium 152 and has not been subjected to the post development process is also stored in the buffer unit 115 (S521). Then, the control unit 161 reads out the RAW file directly from the buffer unit 115 if the RAW file remains in the buffer unit 115, or from the recording medium 152 at S522 if the RAW file does not remain in the buffer unit 115, and advances the processing to S523. A pre-defined number of RAW files are held in the buffer unit 115, starting from the most recently shot RAW file. Accordingly, the control unit 161 knows that the RAW file to be subjected to the post development process is stored in the buffer unit 115 if the RAW file is included in the pre-defined numbers of RAW files starting from the most recently shot RAW file of the RAW files recorded in the recording medium 152. Note that the control unit 161 may acquire information on the RAW file obtained during recording from the recording and reproducing unit 151, and save the correspondence between the RAW file stored in the buffer unit 115 and the RAW file recorded in the recording medium 152.

Note that if there are a plurality of RAW files that have not been subjected to the post development process and are not present in the buffer unit 115, the control unit 161 may read out these RAW files one by one, and perform the post development process thereon. Alternatively, the control unit 161 may read out any number of RAW files at once within a range that can be stored in the buffer unit 115.

In the case of reading out the RAW files from the recording medium 152, the control unit 161 reads out the RAW files in a chronological order, and stores them in the buffer unit 115. Then, when the storage area in the buffer unit 115 becomes full, the oldest RAW image data is deleted from the buffer unit 115, and RAW image data that is newly shot or read out from the recording medium 152 is stored in the buffer unit 115. By doing so, the most recently shot RAW image data is always held in the buffer, and therefore, S522 can be skipped, thus performing the process at high speed. Furthermore, by performing the post development process backward in time from the most recently shot image, the process can be completed from the images held in the buffer unit 115, and it is thus possible to increase the processing efficiency.

At S523, the control unit 161 supplies the RAW image data to be subjected to the post development process to the RAW decompression unit 114. The RAW decompression unit 114 outputs the RAW image data after restoring the RAW image data by decompression if it has been compressed, or directly outputs the RAW image data if it has not been compressed. Whether or not the RAW image data has been compressed can be determined, for example, by recording identifiable information at the head of the RAW image data during compression.

The RAW image data output by the RAW decompression unit 114 is supplied to the development unit 110. During the post development process, the control unit 161 controls the operation such that the development process is performed by the high-quality development unit 112 and the development process is not performed by the simplified development unit 111. The high-quality development unit 112 applies a development process that can provide an image having higher image quality than that obtained by the simplified development unit 111 to the RAW image data (S524). In the present embodiment, the high-quality development unit 112 does not reduce the number of pixels of the RAW image data, and increases the quality (e.g., precision and the number of steps) of the development process applied than that of the simplified development unit 111. However, there is no limitation on the specific details of the development process performed by the high-quality development unit 112, as long as image processing that can provide an image having higher quality than that obtained by the simplified development unit 111. For example, the number of image pixels may be increased, with the details of the development process being the same as those of the simplified development unit 111. Alternatively, the number of image pixels may be reduced in the same manner, while increasing the quality of the development process.

The high-quality development unit 112 performs the so-called development process, including, for example, debayering (demosaicing) a RAW image to convert the image into signals composed of a luminance and a color difference, removing noise contained in each signal, correcting optical distortion, and perform image adjustment. The number of pixels of a developed image generated by the high-quality development unit 112 remains the same as the number of pixels read out from the image sensor unit 102, or is a number of pixels set by the user. Accordingly, the number of pixels of the image data from the high-quality development unit 112 is larger than that of the image data output from the simplified development unit 111.

While the high-quality development unit 112 can provide a developed image having higher image quality because it performs various types of processing with higher precision than the simplified development unit 111, the processing load thereof is large. The high-quality development unit 112 of the present embodiment avoids using a circuit that requires large power consumption and a high cost by not performing a real-time development process in parallel with shooting.

The image data developed by the high-quality development unit 112 is supplied to the still image compression unit 141, and the still image compression unit 141 performs high-efficiency encoding processing (still image compression) on the acquired image data (S525), thus generating high-quality still image data.

At S526, the recording and reproducing unit 151 records a still image file containing the high-quality still image data in the recording medium 152.

S527 is processing of determining whether the imaging apparatus 100 is no longer in the idle state, and may be, for example, processing of determining whether a pre-defined event that causes the imaging apparatus 100 to exit from the idle state is generated. The event may be, for example, input of a shooting preparation instruction or shooting start instruction, input of an instruction to execute reproduction processing, a CPU operating ratio exceeding the threshold, and the like. Note that the generation of these events is not performed at the timing indicated by S527 in fact, but is monitored in the background by the control unit 161 during the idle process. Whether the operation being performed is to be suspended or stopped upon detection of the generation of an event, or to be continued until the recording of a still image ends may be pre-defined. For example, the determination as to whether to continue, or suspend or stop the processing may vary depending on which of the processing at S522 to S526 is being executed. Alternatively, the determination may vary depending on the event that has generated. For example, the processing may transition immediately to shooting processing when an event for which a time lag raises a problem, such as a shooting start instruction, is generated and the processing may transition to reproduction processing after the recording of a still image ends when an event that is less urgent, such as an instruction to start reproduction, is generated.

In the case of suspending the processing, the control unit 161 performs suspension processing of storing the necessary information such that the suspended processing can be resumed when the imaging apparatus 100 next enters in the idle state (S528). The suspension processing includes, for example, saving of data for which the process has been completed halfway and saving of information indicating how far the process is completed. On the other hand, in the case of stopping the processing, the unprocessed RAW file may be processed in the next processing, and therefore, it is not necessary to perform the suspension processing.

When the imaging apparatus 100 is no longer in the idle state, the control unit 161 transitions to the processing in accordance with the operating mode and the event that were performed before the idle process has been performed. For example, if a shooting instruction is input when the processing has transitioned from the still image shooting mode to the idle process, the control unit 161 causes the processing in the still image shooting mode to be resumed from the shooting processing at S310.

After the recording process has ended at S526, if the idle state is continued, the processing is returned to S520. If there is any remaining RAW image data on which the post development process has not been performed, the above-described processing is repeatedly performed.

The high-quality still image file recorded at S526 has the same configuration as that of the still image file of the image data processed by the simplified development unit 111 except that the development status 405 is information indicating that the still image file has been processed by the high-quality development unit 112.

Note that the high-quality still image file recorded at S526 is recorded under the same file name as the simplified still image file recorded together with the RAW file. This can be achieved by notifying the still image file name contained in the metadata portion of the read out RAW file from the recording medium management unit 172 to the recording and reproducing unit 151. In the case of using the RAW image data remaining in the buffer unit 115, the metadata of the corresponding RAW file recorded in the recording medium 152 may be referred to. Alternatively, the recording and reproducing unit 151 may notify the file name to the control unit 161 when recording the simplified still image file, and the control unit 161 may save the file name in association with the RAW image data in the buffer unit 115. With such a file name, the simplified still image file in the recording medium 152 can be replaced with the high-quality still image file.

When recording the high-quality still image file, the recording medium management unit 172 updates the development status 415 in the metadata portion 412 in the corresponding RAW file with information indicating that the high-quality development has been performed thereon (or that the post development process has been performed thereon) through the recording and reproducing unit 151.

Thus, the imaging apparatus 100 of the present embodiment performs the post development process in a user operation waiting state in which the processing load of the apparatus is relatively small, including, for example, during intervals between shootings, in the reproduction mode, and in the sleep state. Then, the still image file obtained by the simplified development during shooting is replaced with the still image file obtained by the high-quality development using the RAW file. Consequently, even if a high-quality image is required, for example, for display for checking the details or print out, it is not necessary to perform the development process each time such an occasion arises. In addition, it can be utilized in the same general environment as with a conventional still image file.

Note that a moving image file obtained by the simplified development during shooting is also subjected to the post development process in the same manner, and is replaced with a moving image file obtained by the high-quality development. Since each frame of the RAW moving image data is constituted by RAW image data, the frame can be developed in the same manner as the still image file. Then, by encoding the developed frame image in accordance with the encoding scheme of the moving image, a high-quality moving image file is successively generated. Note that in order to increase the efficiency of encoding processing, the unprocessed RAW file can be read out from the recording medium 152 in units of the number of frames (e.g., the number of frames constituting GOP) in accordance with the encoding scheme of the moving image.

In the case of suspending the post development process for the moving image file, for example, when the moving image compression unit 142 performs encoding in units of a predetermined number of frames in the suspension processing at S528, the moving image compression unit 142 waits until a high-quality moving image file is written in the recording medium 152 for each encoding unit. Then, at the time of writing the high-quality moving image file (overwriting the simplified moving image file), the recording medium management unit 172 saves the file name of the RAW moving image data being subjected to the post development process and information indicating that the number of frames for which the process has ended. Then, the post development process is resumed using this information when the imaging apparatus 100 next enters in the idle state. During the post development process of a moving image, each time a high-quality moving image file is written for each encoding unit, the file may be closed, and the management information of the recording medium 152 may be updated. Alternatively, processing of ending writing of these files may be performed during suspension. While the former involves more complicated processing, it requires less time for the processing to transition from the post development process to another process and can reduce the possibility of a damaged file and the like. Note that the post development process of a moving image is the same as the post development process of a still image in that the process may be immediately stopped depending on the event, but is different even in this case in that the currently processed moving image file in the recording medium 152 is closed.

(Estimation Process)

Figure 5A:
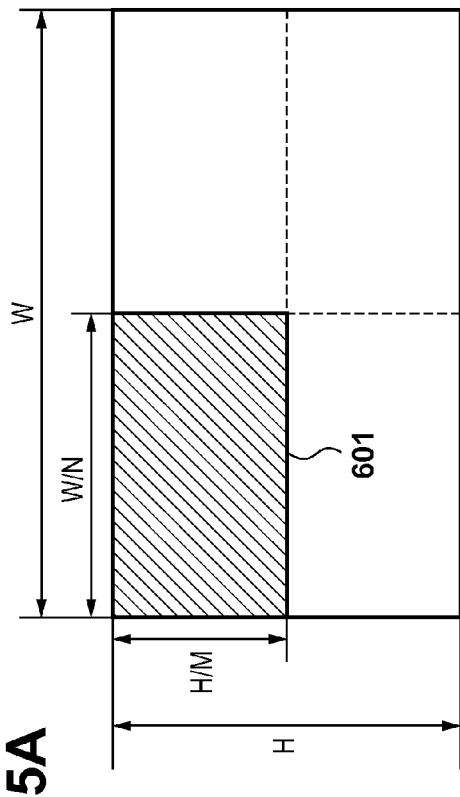
FIGS. 5A and 5B are diagrams showing an exemplary relationship between image data amounts before and after a simplified development in an embodiment.
Figure 5B:
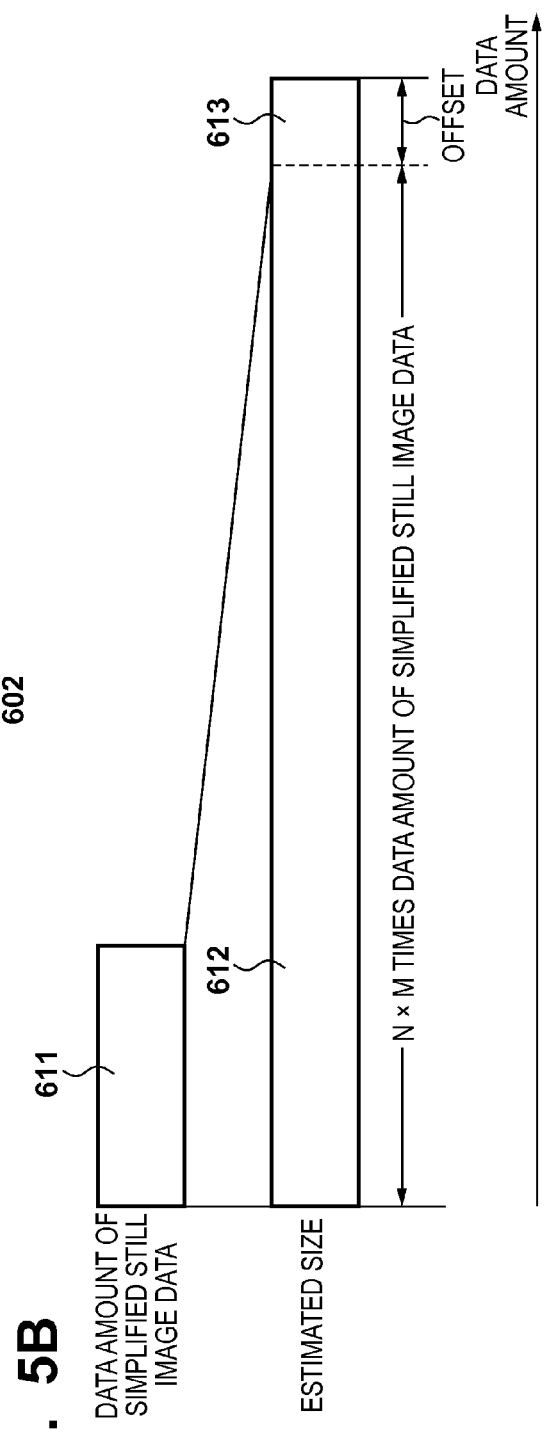

Next is a description of estimation processing performed by the data amount estimation unit 171, with reference to FIGS. 5A and 5B. In the present embodiment, the data amount of high-quality still image data generated from the RAW image data by the post development process is estimated during recording of the RAW image data. FIG. 5A is a diagram showing a magnitude relationship between the number of pixels of image data output from the sensor signal processing unit 103 and the number of pixels of image data that has been subjected to simplified development. Numeral 601 denotes image data that has been subjected to simplified development. Numeral 602 denotes image data output from the sensor signal processing unit 103.

In the present embodiment, as shown in FIG. 5A, the number of pixels of the image data output from the sensor signal processing unit 103 is reduced by 1/N times horizontally and 1/M times vertically by the simplified development unit 111. Accordingly, the number of pixels of the image data that has been subjected to the simplified development process is 1/(N×M) times that of the image data from the sensor signal processing unit 103.

FIG. 5B is a diagram showing a relationship between the data amount of simplified still image data generated as a result of performing high-efficiency encoding processing (still image compression) on an output from the simplified development unit 111 by the still image compression unit 141, and the estimated data amount calculated by the data amount estimation unit 171.

Numeral 611 denotes the data amount of the simplified still image data. Numeral 612 denotes the calculated estimated data amount. Numeral 613 denotes a predetermined offset. The data amount estimation unit 171 calculates the data amount of the high-quality still image data, for example, by the following equations:

$$\text{Estimated Data Amount}=(\text{SIZE}/\text{RED\_RATIO})+\text{OFS} \quad (1)$$

or $$\text{Estimated Data Amount}=(\text{SIZE} \times N \times M)+\text{OFS} \quad (1')$$

where
SIZE: Data amount of simplified still image data
RED_RATIO: Reduction ratio (=1/(N×M))
OFS: Offset In the example shown in FIGS. 5A and 5B, the estimated data amount 612 is a value obtained by multiplying the data amount 611 of the simplified still image data by (N×M) times and increasing the resulting data amount by the offset 613. The magnitude of the offset 613 can be determined taking into consideration the capacity of the area (e.g., the header) that is added when the image file is generated from the encoded image data.

Next is a description of processing performed by the recording medium management unit 172, with reference to FIGS. 6A to 6D.

In the present embodiment, when the high-quality still image data generated by the post development process has been recorded in the recording medium 152, the corresponding simplified still image data is deleted from the recording medium 152 (the deletion includes overwriting the simplified still image data with the high-quality still image data). The recording medium management unit 172 manages the recording area in the recording medium 152, generates management information indicating the address and the data amount of each file recorded in the recording medium 152, and holds the management information in its internal memory.

FIG. 6A shows management information 700 indicating the recording area (address) and data amount of each file recorded in the recording medium 152 before the post development process is performed. FIG. 6B is a diagram showing the arrangement of the files on the recording medium 152 before the post development process. FIG. 6C shows management information 710 indicating the recording area (address) and data amount of each file recorded in the recording medium 152 after the post development process. FIG. 6D is a diagram showing the arrangement of the files on the recording medium 152 after the post development process.

A management information generation process prior to the post development process will be described with reference to FIG. 6A. In the management information 700, numeral 701 denotes information regarding the recording area and data amount of the RAW file, numeral 702 denotes information regarding the recording area and data amount of the simplified still image file, and numeral 703 denotes information regarding the reserved area.

In response to a still image recording instruction, the RAW compression unit 113 acquires the RAW image output from the sensor signal processing unit 103 that corresponds to the shot still image, and performs high-efficiency encoding (RAW compression) on the RAW image. When the data amount of the RAW image data has been notified, the recording medium management unit 172 determines a recording address of the RAW image file in the recording medium 152. Then, the recording medium management unit 172 instructs the recording and reproducing unit 151 to record the RAW file at the determined address, generates information (address, data amount) 701 regarding this RAW file, and holds the information in the internal memory.

The still image compression unit 141 acquires the image data developed by the simplified development unit 111, and performs high-efficiency encoding processing (still image compression) on the image data to generate simplified still image data. When the data amount of the simplified still image data has been notified, the recording medium management unit 172 determines a recording address of the still image file in the recording medium 152. Then, the recording medium management unit 172 instructs the recording and reproducing unit 151 to record the still image file at the determined address, generates information (address, data amount) 702 regarding the simplified still image file, and holds the information in the internal memory.

Furthermore, the recording medium management unit 172 sets a reserved area for a data amount obtained by subtracting the data amount of the simplified still image file from the estimated data amount notified by the data amount estimation unit 171. Then, the recording medium management unit 172 holds information (information on the recording address and the data amount) 703 on this reserved area in the internal memory, and controls the recording and reproducing unit 151 to prohibit writing of data to the reserved area. The reserved area 703 is handled as a single area. When the estimated data amount is notified as a result of shooting, the content of the information 703 on the reserved area is changed based on the notified data amount. Note that a plurality of pieces of information 703 (e.g., for each simplified still image file) on the reserved area may be provided.

The recording medium management unit 172 generates the management information on the recording area in the above-described manner, and updates the management information in accordance with the recording processing. Based on the management information, the recording medium management unit 172 ensures the reserved area in the recording medium 152, controls the recording processing performed by the recording and reproducing unit 151, and manages the file recorded in the recording medium 152.

The processing performed by the recording medium management unit 172 during the post development process will be described with reference to FIG. 6C. In the management information 710 after the post development process, numeral 711 denotes information regarding the RAW file, numeral 712 denotes information regarding the high-quality still image file generated by the post development process, and numeral 713 denotes information regarding the reserved area.

As described above, during the post development process, the RAW file recorded in the recording medium 152 is decoded, and thereafter the development process is performed by the high-quality development unit 112, and high-efficiency encoding processing (still image compression) is performed by the still image compression unit 141, thereby generating high-quality still image data. When the data amount of the high-quality still image data from the still image compression unit 141 has been notified, the recording medium management unit 172 allocates a part of the reserved area to a recording area of the high-quality still image file, and determines a recording address. Then, the recording medium management unit 172 records the high-quality still image file at the determined recording address, and instructs the recording and reproducing unit 151 to delete the simplified still image file corresponding to the RAW file used to generate this high-quality still image file. In addition, the recording medium management unit 172 registers the information (address, data amount) 712 regarding the high-quality still image file in the management information 710, and deletes, from the management information 710, the information regarding the simplified still image file deleted from the recording medium 152 to update the management information 710. Furthermore, the recording medium management unit 172 changes the reserved area in the recording medium 152, and updates the information 713 on the reserved area.

The information (address, data amount) 711 regarding the RAW file does not change before and after the post development process. On the other hand, the content of the reserved area 713 changes from the information 703 on the reserved area, according to the difference between the estimated data amount and the data amount of the high-quality still image file generated by the post development process.

The recording medium management unit 172 manages and controls the file recording to the recording medium 152 in the recording and reproducing unit 151 after the post development process in the above-described manner. FIG. 6D shows a state of the file recording in the recording medium 152 that corresponds to the management information 710 in FIG. 6C.

Note that the recording medium management unit 172 also generates and updates the management information for the moving image data in the same manner.

(Encoding Processing During Post Development Process)

Figure 7:
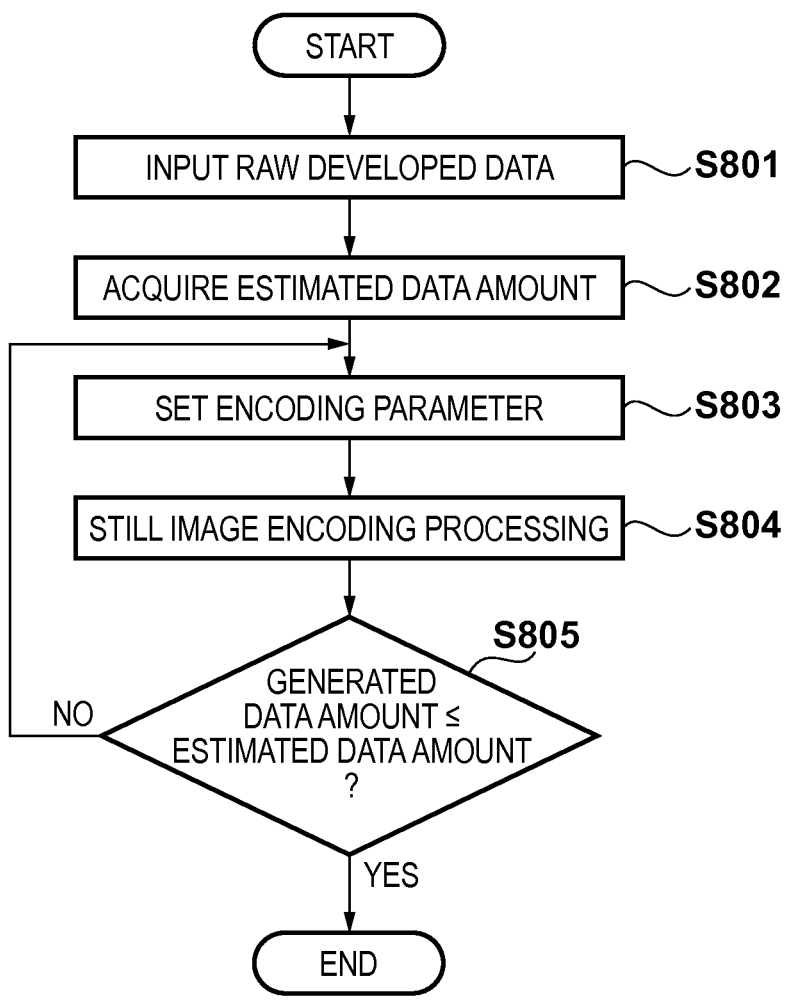
FIG. 7 is a flowchart illustrating operations of a still image compression unit in an embodiment.

Next is a description of encoding processing for still image data during the post development process. FIG. 7 is a flowchart illustrating processing performed by the still image compression unit 141 during the post development process.

The still image compression unit 141 acquires image data from the high-quality development unit 112 (S801), and acquires estimated data amount, for example, through the control unit 161 (S802). The still image compression unit 141 sets an encoding parameter (S803), and performs encoding processing based on the setting (S804) to generate a still image file. Note that the still image compression unit 141 may set the encoding parameter taking the estimated data amount into consideration at S803. For example, the encoding parameter taking the estimated data amount into consideration can be set by setting in advance an encoding parameter that is set according to the range of the estimated data amount. Note that the encoding parameter may include a quantization table.

The still image compression unit 141 determines whether the data amount of the generated still image data is less than or equal to the estimated data amount (S805). If the data amount of the generated still image data is less than or equal to the notified estimated data amount, the processing ends; otherwise, the processing proceeds to S803, at which the setting of the encoding parameter is changed such that the data amount is smaller, and encoding processing is performed again.

By doing so, the data amount of the still image data generated by the still image compression unit 141 during the post development process is always less than or equal to the estimated data amount of the data amount estimation unit 171. Accordingly, there will be no shortage of a reserved area at the time of writing a high-quality still image file generated by the post development process.

As described thus far, according to the present embodiment, during shooting, the RAW image is recorded together with the image that has been subjected to the simplified development process. Thereafter, the post development process is performed in which the development process that can provide an image having higher quality than that obtained by the simplified development process is applied to the recorded RAW image to generate a high-quality image, and the image obtained by the simplified development process is replaced with the high-quality image. This configuration makes it possible to achieve rapid continuous shooting or the like without a circuit that performs a development process at high speed, and also to easily check the content of the RAW image, for example, when the content is to be checked from another apparatus.

In addition, by automatically performing the post development process when the load of the imaging apparatus is low, a high-quality image can be obtained without the user being aware of the post development process. Accordingly, at the time of reproduction, the high-quality image can be immediately reproduced without the trouble of performing the post development process.

Furthermore, the capacity of the recording medium is reserved based on the estimated data amount of the image obtained by the post development process, based on the result of the simplified development. Also, during the post development process, encoding processing is performed based on the estimated data amount. Thereby, it is possible to prevent a shortage of capacity of the recording medium during the post development process.

Second Embodiment

Figure 8:
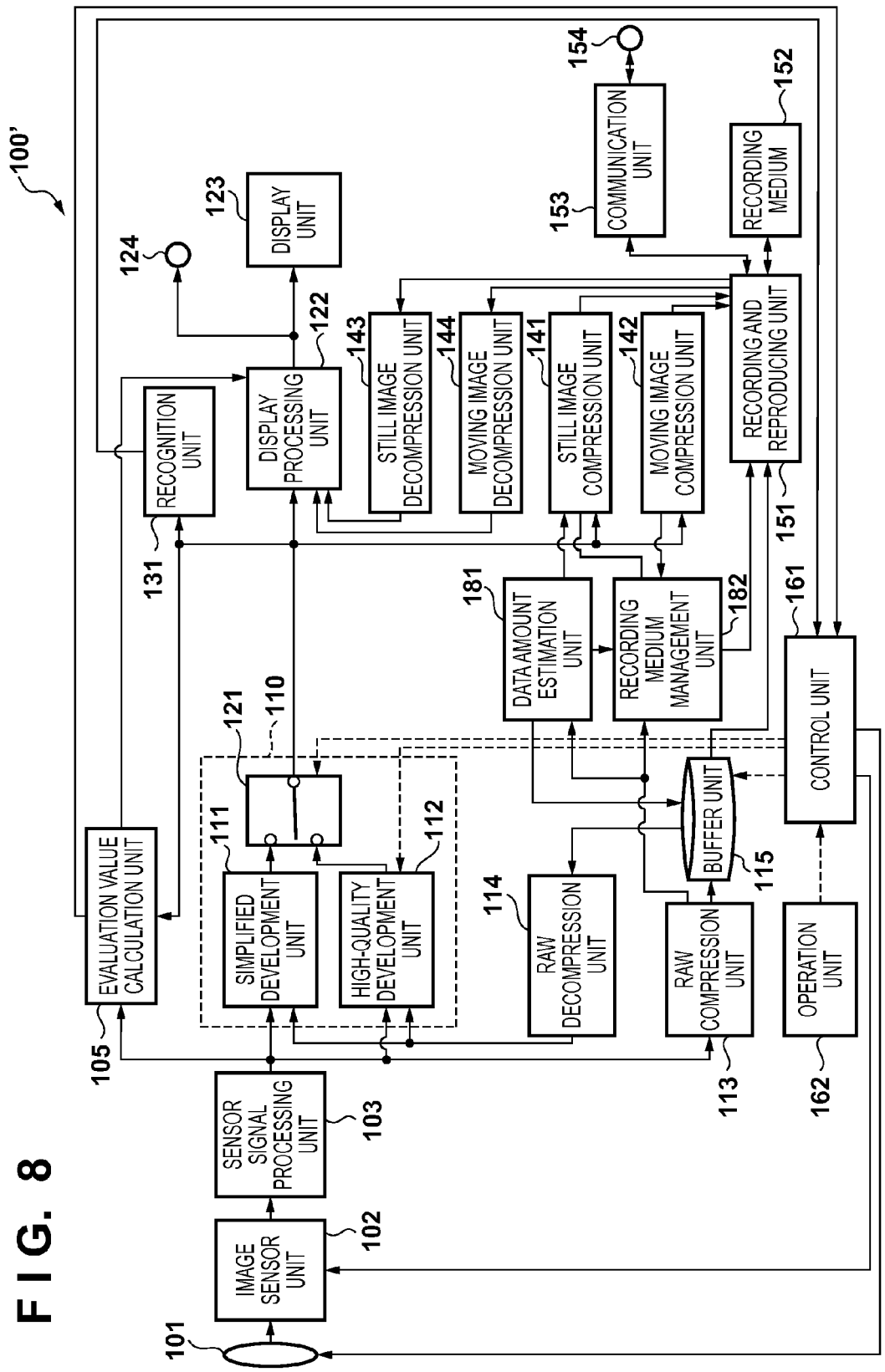
FIG. 8 is a block diagram showing an exemplary configuration of an imaging apparatus according to a second embodiment.

FIG. 8 is a block diagram showing an exemplary configuration of an imaging apparatus 100' according to a second embodiment of the present invention. The imaging apparatus 100' of the present embodiment is different from the configuration of the first embodiment in the following respects.

The still image compression unit 141 does not notify the still image data amount to a data amount estimation unit 181, but the RAW compression unit 113 notifies the compressed data amount to a recording medium management unit 182.

The data amount estimation unit 181 uses the RAW data amount notified from the RAW compression unit 113 to estimate the data amount when the still image compression unit 141 encodes the output of the high-quality development unit 112, and notifies the estimated data amount to the recording medium management unit 182 and the still image compression unit 141.

The following is a description of the difference from the first embodiment.

<Data Amount Estimation Process>

The image data developed by the development unit 110 is supplied to the still image compression unit 141 and the moving image compression unit 142. In the case of compressing the image data as a still image, the still image compression unit 141 is used. In the case of compressing the image data as a moving image, the moving image compression unit 142 is used. The still image compression unit 141 and the moving image compression unit 142 encode the image data of interest to generate image data whose information amount has been compressed, convert the image data into an image file (a still image file or moving image file), and notify the encoded data amount to the recording medium management unit 182. Note that the data amount notified may be the file size or the amount of image data.

The RAW compression unit 113 applies wavelet transform, differential encoding, or the like to the RAW image data output from the sensor signal processing unit 103 to generate compressed RAW data whose data amount has been reduced, and stores the compressed RAW data in the buffer unit 115. In addition, the RAW compression unit 113 notifies the compressed RAW data amount to the data amount estimation unit 181 and the recording medium management unit 182.

The data amount estimation unit 181 estimates a still image data amount from the notified RAW data amount. The data amount estimation unit 181 can estimate the still image data amount corresponding to the RAW data amount, for example, by using the relationship between a RAW data amount and a still image data amount that has been empirically derived in advance. In general, the compression ratio of RAW data is higher for a simpler image, and is lower for a more complicated image. Therefore, it can be considered that a large compressed RAW data amount indicates a complicated image, and a small compressed RAW data amount indicates a simple image. Since the still image data amount also tends to increase with an increasing level of complexity of the image, it is possible to estimate the still image data amount from the compressed RAW data amount by measuring the relationship between the compressed RAW data amount and the still image data amount in advance. Note that when the sizes of the still image data amount and the still image file are significantly different, or when the data amount is more accurately estimated, it is possible to estimate a still image data amount for which the capacity of the file header or the like is taken into consideration, as the offset 613 described in the first embodiment.

Thus, in the present embodiment, it is possible to estimate the still image data amount from the compressed RAW data amount. Accordingly, the still image file generated by the post development process can be reliably recorded in the recording medium even when the image data output from the simplified development unit 111 is not subjected to compression encoding.

Third Embodiment

Next is a description of an imaging apparatus according to a third embodiment of the present invention. The imaging apparatus of the present embodiment is different from the configuration of the first embodiment in the following respects.

When the still image compression unit 141 generates a plurality of pieces of still image data during the post development process, re-encoding for reducing the data amount to be less than or equal to the estimated data amount is not performed until a predetermined number of still images is reached even if the amount of the generated still image data exceeds the estimated data amount, and the estimated data amount is changed.

After the predetermined number of still images has been exceeded, re-encoding is performed so as to reduce the amount of the still image data to be less than or equal to the estimated data amount when the amount of the generated still image data exceeds the estimated data amount, as with the first embodiment.

The rest of the configuration and the operation are the same as those of the first embodiment, and therefore, the description thereof has been omitted.

The following is a description of a case where the above-described predetermined number of still images is four when still image data for five still images is generated, or in other words, control is performed so as to perform re-encoding only for the last still image when the amount of the generated still image data exceeds the estimated data amount. However, this is merely an example, and still image data for the last plurality of still images may be the subject of re-encoding control.

<Still Image Encoding Processing>

Figure 9:
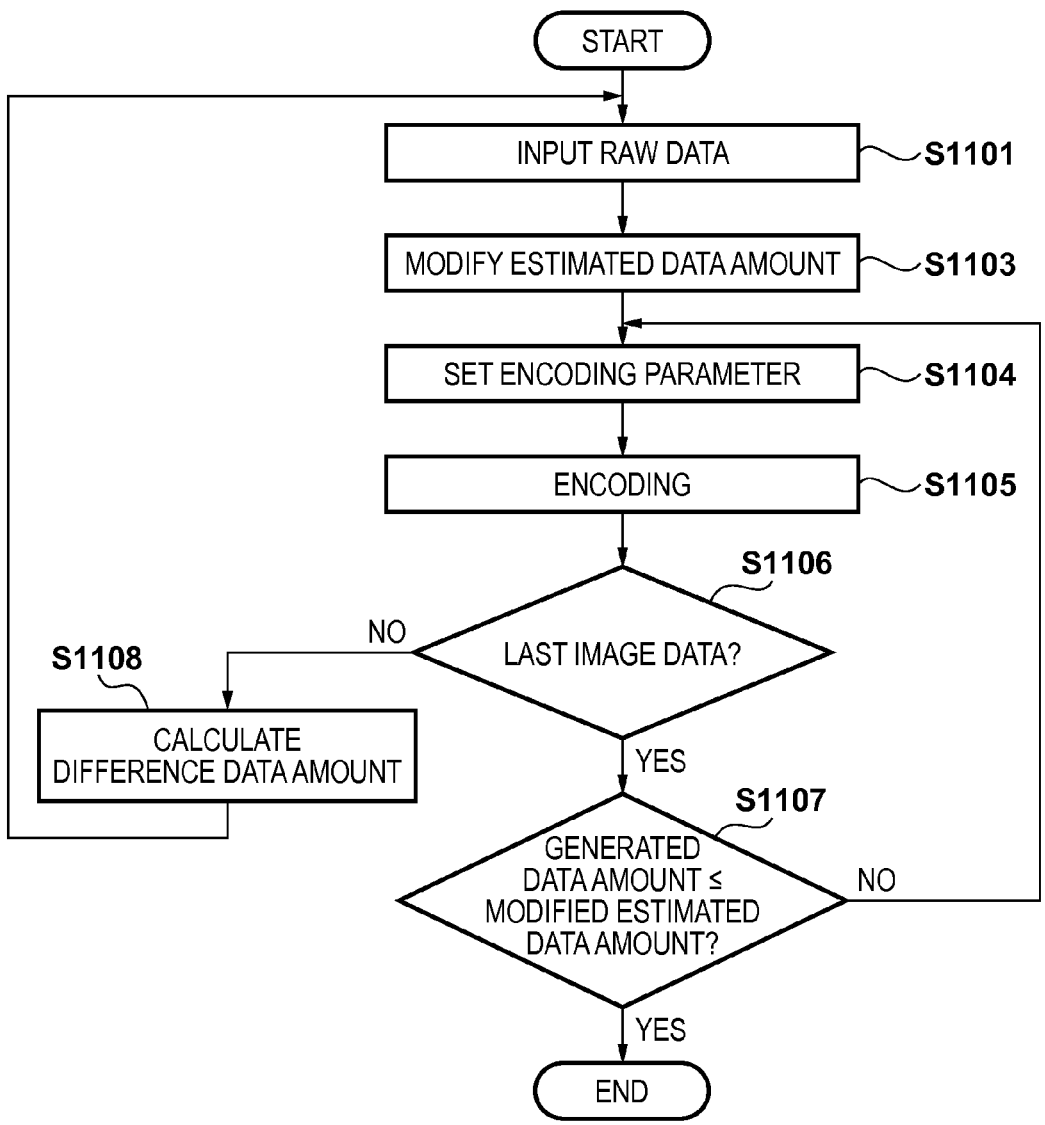
FIG. 9 is a flowchart illustrating operations of a still image compression unit in a third embodiment.

Of the processing performed by the still image compression unit 141, the details of the processing performed on the image data output from the high-quality development unit 112 during the post development process will be described with reference to the flowchart shown in FIG. 9.

The still image compression unit 141 acquires the image data output from the high-quality development unit 112 (S1101). In addition, the still image compression unit 141 modifies the estimated data amount notified from the data amount estimation unit 171 by using the data amount generated during the immediately preceding still image encoding (S1103).

One example of the method for modifying the estimated data amount performed at S1103 will be described with reference to FIG. 10.

FIG. 10 shows an example of an estimated data amount, a modified estimated data amount, a generated still image data amount, and a difference (difference data amount) between the modified estimated data amount and the generated still image data amount, for data for five still images on which encoding is performed. In FIG. 10, the data amounts are described in hexadecimal.

Numeral 1201 denotes the estimated data amount notified from the data amount estimation unit 171.

Numeral 1202 denotes the modified estimated data amount. The still image compression unit 141 modifies the estimated data amount by adding the previous difference data amount 1205 calculated during the previous (immediately preceding image) encoding processing to the estimated data amount notified from the data amount estimation unit 171. The previous difference data amount 1205 that is used to encode the first image data is 0.

At S1104, the still image compression unit 141 sets an encoding parameter (e.g., a quantization parameter) taking the estimated data amount into consideration, and performs encoding processing at S1105.

The amount of the encoded data generated at S1105 is a still image data amount (generated data amount) 1203 in FIG. 10.

At S1106, the still image compression unit 141 advances the processing to S1107 if it is determined that encoding processing for the last image data has ended, and advances the processing to S1108 if it is determined that there is unprocessed image data.

At S1108, the still image compression unit 141 calculates the difference data amount 1204 between the modified estimated data amount 1202 and the generated data amount 1203 (FIG. 10). The difference data amount 1204 has a positive value if the generated data amount 1203 is less than the modified estimated data amount 1202, and has a negative value if the generated data amount 1203 is greater than the modified estimated data amount 1202.

At S1107, if the generated data amount for the last image data is less than or equal to the modified estimated data amount, the still image compression unit 141 ends the encoding processing. On the other hand, if the generated data amount for the last image data exceeds the modified estimated data amount, the still image compression unit 141 returns the process to S1104, at which re-encoding processing is performed. At the time of re-encoding, the still image compression unit 141 sets, at S1104, an encoding parameter that makes the generated data amount less than that in the previous encoding.

The above-described processing will be specifically described with reference to FIG. 10.

For example, for the first image (JPEG_0_1), the estimated data amount 1201 is 0×300 and the previous difference data amount 1205 is 0 (because this is the first image), and therefore, the modified estimated data amount is 0×300. Since the generated data amount 1203 is 0×280, the difference data amount is 0×80.

Likewise, for the second image (JPEG_0_2), the estimated data amount 1201 is 0×300 and the previous difference data amount 1205 is 0×80, and therefore, the modified estimated data amount 1202 is 0×380. Since the generated data amount 1203 is 0×400, the difference data amount 1204 is −0×80.

The still image compression unit 141 also performs the processing on the third and fourth images in the same manner.

The most recent difference data amount 1204 thus obtained indicates the difference between a total of the estimated data amount 1201 and the generated data amount of the image data that has been encoded thus far. Accordingly, by performing encoding processing such that the generated data amount 1203 is less than or equal to the modified estimated data amount 1202 for the last image, the data amount can be contained in the area reserved in the recording medium 152.

In the example shown in FIG. 10, the difference data amount 1204 at the time when encoding processing has ended up to the fourth image is 0×40, and a total of the estimated data amount 1201 was greater than the generated data amount. However, the generated data amount 1203 for the fifth image exceeded the modified estimated data amount 1202 by 0×40. Accordingly, the still image compression unit 141 performs re-encoding processing on the fifth image.

At the time of re-encoding, the initial value is continued to be used without re-modifying the modified estimated data amount. Accordingly, in the example shown in FIG. 10, the difference data amount 1204 after the first encoding processing on the fifth image is −0×40, whereas the previous difference data amount 1205 during re-encoding is 0×40, which is the difference data amount 1204 for the fourth image, and the modified estimated data amount 1202 is 0×340. In the example shown in FIG. 10, the generated data amount less than or equal to the modified estimated data amount was able to be achieved by a single operation of re-encoding, and thus, re-encoding ended with a single operation. However, if the generated data amount still exceeds the modified estimated data amount, a further operation of re-encoding is performed.

Note that if the last image data is not the only subject of re-encoding, it is determined at S1106 that whether the image data is the subject of re-encoding. If the image data is not the subject of re-encoding, the processing moves to S1108, and if the image date is the subject of re-encoding, the processing moves to S1107. If the generated data amount is less than or equal to the modified estimated data amount at S1107, the processing moves to S1108 if any unprocessed image data remains. If no unprocessed data remain, the encoding processing ends.

Thus, in the present embodiment, it is possible to save the processing time and the processing load associated with re-encoding processing by the still image compression unit 141 not performing re-encoding control for a series of image data, except for at least the last image data. On the other hand, re-encoding processing is performed as needed such that a total of the data amount generated by encoding processing for the series of image data falls within a total of the estimated data amount, and thus, the high-quality image obtained by the post development process can be reliably recorded in the recording medium 152.

Fourth Embodiment

Next is a description of an imaging apparatus according to a fourth embodiment of the present invention. The imaging apparatus of the present embodiment is different from the configuration of the first embodiment in the following respects.

At the time of recording the high-quality image file generated by the post development process in the recording medium, the recording and reproducing unit 151 does not discard but holds the corresponding simplified image file. More specifically, the recording and reproducing unit 151 records the high-quality image file under a file name different from that of the simplified image file.

In the recording medium management unit 172, the estimated data amount notified from the data amount estimation unit 171 is additionally written to the reserved area.

The rest of the configuration and the operation are the same as those of the first embodiment, and therefore, the description there has been omitted.

<Management Information Generation Process>

The processing performed by the recording medium management unit 172 according to the present embodiment will be described with reference to FIGS. 11A to 11D.

FIG. 11A shows management information 1300 indicating the recording areas (addresses) and data amounts of files recorded in the recording medium 152 before the post development process. FIG. 11B is a diagram showing the arrangement of the files on the recording medium 152 before the post development process is performed. FIG. 11C shows management information 1310 indicating the recording areas (addresses) and data amounts of the files recorded in the recording medium 152 after the post development process. FIG. 11D is a diagram showing the arrangement of the files on the recording medium 152 after the post development process.

A description will be given on a management information generation process prior to the post development process, with reference to FIG. 11A. In the management information 1300, numeral 1301 denotes information regarding the recording area and the data amount of the RAW file, numeral 1302 denotes information indicating the recording area and the data amount of the simplified still image file, and numeral 1303 denotes information regarding the reserved area.

In response to a recording instruction, the RAW compression unit 113 acquires the RAW image output from the sensor signal processing unit 103 that corresponds to the shot still image, and performs high-efficiency encoding (RAW compression) on the RAW image. When the data amount of the RAW image data has been notified, the recording medium management unit 172 determines a recording address of the RAW image file in the recording medium 152. Then, the recording medium management unit 172 instructs the recording and reproducing unit 151 to record the RAW file at the determined address, generates information (address, data amount) 1301 regarding the RAW image file, and holds the information 1301 in the internal memory.

The still image compression unit 141 acquires the image data developed by the simplified development unit 111, and performs high-efficiency encoding processing (still image compression) thereon to generate simplified still image data. When the data amount of the simplified still image data has been notified, the recording medium management unit 172 determines a recording address for the still image file in the recording medium 152. Then, the recording medium management unit 172 instructs the recording and reproducing unit 151 to record the still image file at the determined address, generates information (address, data amount) 1302 regarding the simplified still image file, and holds the information 1302 in the internal memory.

Furthermore, the recording medium management unit 172 sets a reserved area from the estimated data amount notified from the data amount estimation unit 171. The first embodiment is configured such that the simplified still image file is erased at the time of recording the high-quality still image file generated by the post development process. Accordingly, the size of the reserved area is determined based on the data amount resulting from excluding the data amount of the simplified still image file from the estimated data amount. In the present embodiment, the simplified still image file is not erased at the time of recording the high-quality still image file. Accordingly, the size of the reserved area is determined without excluding the data amount of the simplified still image file from the estimated data amount. Then, the information 1303 (information on the recording address and the data amount) of this reserved area is held in the internal memory, and the recording and reproducing unit 151 is controlled so as to prohibit writing of data to this reserved area. Reservation information of the information 1303 is handled as a single reserved area. When the estimated data amount has been notified, the information 1303 on the reserved area is changed based on the notified data amount.

The recording medium management unit 172 generates the management information for the recording area in the above-described manner, and updates the management information according to the recording process. The recording medium management unit 172 ensures the reserved area in the recording medium 152 based on the management information, controls the recording process performed by the recording and reproducing unit 151, and manages the files recorded in the recording medium 152.

The processing performed by the recording medium management unit 172 during the post development process will be described with reference to FIG. 11C. In the management information 1310 after the post development process, numeral 1311 denotes information regarding the RAW file, numeral 1312 denotes information regarding the simplified still image file, numeral 1313 denotes information regarding the high-quality still image file generated by the post development process, and numeral 1314 denotes information regarding the reserved area.

As described above, during the post development process, the development process is performed by the high-quality development unit 112 for the RAW file recorded in the recording medium 152, and high-efficiency encoding processing (still image compression) is performed by the still image compression unit 141, thereby generating high-quality still image data. At this time, if the generated data amount exceeds the estimated data amount, the encoding parameter is changed, and re-encoding is performed until the generated data amount becomes less than or equal to the estimated data amount.

When the high-quality still image data amount has been notified from the still image compression unit 141, the recording medium management unit 172 allocates a part of the reserved area to the recording area for the high-quality still image file, and determines a recording address. Then, the recording medium management unit 172 records the high-quality still image file at the determined recording address. In addition, the recording medium management unit 172 registers information (address, data amount) 1313 regarding the high-quality still image file to update the management information 1310. Furthermore, the recording medium management unit 172 changes the reserved area in the recording medium 152, and updates the information 1314 on the reserved area.

The information (address, size) 1311 regarding the RAW file and the management information 1312 (address, size) regarding the simplified still image file do not change before and after the post development process. On the other hand, the information 1314 regarding the reserved area changes from the content of the information 703 on the reserved area by the amount equivalent to the estimated data amount.

In the above-described manner, the recording medium management unit 172 manages and controls the file recording to the recording medium 152 in the recording and reproducing unit 151 and after the post development process. FIG. 11D shows a state of the file recording in the recording medium 152 that corresponds to the management information 1310 in FIG. 11C.

Note that the recording medium management unit 172 also generates and updates the management information for the moving image data in the same manner.

By generating and updating the management information in this manner, the still image file generated by the post development process can be reliably recorded in the recording medium even when a still image file generated from the image data generated by the simplified development process is left in the recording medium after the post development process.

Fifth Embodiment

FIG. 12 is a block diagram showing an exemplary functional configuration of an imaging apparatus 100" according to a fifth embodiment of the present invention. The imaging apparatus of the present embodiment is different from the configuration of the fourth embodiment in the following respects.

A data amount estimation unit 191 does not notify the estimated data amount to a recording medium management unit 192, but notifies the estimated data amount to a dummy data generation unit 193.

The dummy data generation unit 193 generates the dummy data by an amount corresponding to the notified estimated data amount, and the recording and reproducing unit 194 records the dummy data in the recording medium 152.

In addition, the dummy data generation unit 193 notifies the generated dummy data amount to the recording medium management unit 192, and the recording medium management unit 192 registers the notified dummy data amount in the management information.

The rest of the configuration and the operation are the same as those of the first embodiment, and therefore, the description thereof has been omitted.

<Management Information Generation Process>

The processing performed by the recording medium management unit 192 according to the present embodiment will be described with reference to FIGS. 13A to 13D.

FIG. 13A shows management information 1500 indicating the recording areas (addresses) and the data amounts of the files recorded in the recording medium 152 before the post development process is performed. FIG. 13B is a diagram showing the arrangement of the files on the recording medium 152 before the post development process is performed. FIG. 13C shows management information 1510 indicating the recording areas (addresses) and the data amounts of the files recorded in the recording medium 152 after the post development process. FIG. 13D is a diagram showing the arrangement of the files on the recording medium 152 after the post development process.

The management information generation process prior to the post development process will be described with reference to FIG. 13A. In the management information 1500, numeral 1501 denotes information regarding the recording area and the data amount of the RAW file, numeral 1502 denotes information regarding the recording area and the data amount of the simplified still image file, and numeral 1503 denotes information regarding the recording area of the dummy data.

In response to a shooting instruction, the RAW compression unit 113 acquires the RAW image output from the sensor signal processing unit 103 that corresponds to the shot still image, and performs high-efficiency encoding (RAW compression) on the RAW image. When the data amount of the RAW image data has been notified, the recording medium management unit 192 determines a recording address of the RAW image file in the recording medium 152. Then, the recording medium management unit 192 instructs the recording and reproducing unit 194 to record the RAW file at the determined address, generates information (address, data amount) 1501 regarding the RAW image file, and holds the information 1501 in the internal memory.

The still image compression unit 141 acquires the image data developed by the simplified development unit 111, and performs high-efficiency encoding processing (still image compression) thereon to generate simplified still image data. When the data amount of the simplified still image data has been notified, the recording medium management unit 192 determines a recording address of the still image file in the recording medium 152. Then, the recording medium management unit 192 instructs the recording and reproducing unit 194 to record the still image file at the determined address, generates information (address, data amount) 1502 regarding the simplified still image file, and holds the information 1502 in the internal memory.

Furthermore, when the dummy data amount has been notified from the dummy data generation unit 193, the recording medium management unit 192 determines a recording address of the dummy data in the recording medium 152. Then, the recording medium management unit 192 instructs the recording and reproducing unit 194 to record the dummy data at the determined address, generates information (address, data amount) 1503 indicating the dummy data area, and holds the information 1503 in the memory. The dummy data area is handled as a single area. Note that in the case of managing the dummy data based on a file system such as FAT, it is not necessary to actually record the dummy data. In this case, by updating the FAT so as to indicate the entry of the dummy data file and the recording area of the dummy data, it is possible to record the dummy data file in the recording medium 152 without actually recording the dummy data.

Through the above-described generation and updating of the management information on the recording area, the recording medium management unit 192 manages and controls the file recording to the recording medium 152 in the recording and reproducing unit 194, while recording the dummy data in the recording medium 152 and ensuring the dummy data as the reserved area.

The processing performed by the recording medium management unit 192 during the post development process will be described with reference to FIG. 13C. In the management information 1510 after the post development process, numeral 1511 denotes information regarding the RAW file, numeral 1512 denotes information regarding the simplified still image file, and numeral 1513 denotes information regarding the high-quality still image file generated by the post development process. In addition, numeral 1514 denotes information indicating the dummy data area (dummy data file).

As described above, during the post development process, the development process is performed by the high-quality development unit 112 for the RAW file recorded in the recording medium 152, and high-efficiency encoding processing (still image compression) is performed by the still image compression unit 141, thereby generating high-quality still image data. At this time, if the generated data amount exceeds the estimated data amount, the encoding parameter is changed, and re-encoding is performed until the generated data amount becomes less than or equal to the estimated data amount.

When the high-quality still image data amount has been notified from the still image compression unit 141, the recording medium management unit 192 allocates a part of the dummy data area to the recording area of the high-quality still image file, and determines a recording address. Then, the recording medium management unit 192 records the high-quality still image file at the determined recording address. More specifically, the recording medium management unit 192 erases the dummy data from the area where the dummy data has been originally recorded, and overwrites the high-quality still image file to the same area. In addition, the recording medium management unit 192 registers the information (address, data amount) 1513 regarding the high-quality still image file to update the management information 1510. Furthermore, the recording medium management unit 192 updates the information 1514 regarding the dummy data area in the recording medium 152.

The information (address, size) 1511 regarding the RAW file and the management information 1512 (address, size) regarding the simplified still image file do not change before and after the post development process. On the other hand, the information 1514 on the dummy data area changes from the information 1503 regarding the dummy data area by an amount equivalent to the corresponding dummy data amount (estimated data amount).

The recording medium management unit 192 manages and controls the file recording to the recording medium 152 in the recording and reproducing unit 194 after the post development process in the above-described manner. FIG.

13D shows a state of the file recording in the recording medium 152 corresponding to the management information 1510 in FIG. 13C.

Note that the recording medium management unit 192 also generates and updates the management information for the moving image data in the same manner.

By actually recording the dummy data in an amount equivalent to the estimated data amount in the recording medium in this way, the information on the dummy data area is reflected on the management information recorded within the recording medium 152, and is handled as the recorded area. Accordingly, even if the recording medium 152 is used in another apparatus before the post development process, the dummy data area is ensured, thus making it possible to reliably record the high-quality image file generated by the post development process. In addition, since the dummy data area can be managed as a single file, it is possible to save the time and effort to manage the reservation information in the imaging apparatus, thus facilitating the process of generating and updating the management information.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007272 filed on Jan. 17, 2014, which is hereby incorporated by reference herein in its entirety.

What is claimed is:

1. An imaging apparatus comprising:
   an imaging unit;
   an image processing unit configured to acquire RAW image data by using image data obtained by the imaging unit;
   a development unit configured to apply a development process to the RAW image data by using a first development process and a second development process, wherein the second development process is for obtaining an image having higher quality than an image obtained by the first development process;
   an encoding unit configured to encode image data output from the development unit;
   an estimation unit configured to, based on one of:
      (i) a data amount of the RAW image data; and
      (ii) a data amount of first encoded image data obtained by encoding first image data with the encoding unit, wherein the first image data is generated by applying the first development process to the RAW image data,
   estimate a data amount of second encoded image data to be obtained by encoding second image data with the encoding unit, wherein the second image data is generated by applying the second development process to the RAW image data;
   a recording unit configured to record data in a recording medium; and
   a control unit configured to control the recording unit to record the RAW image data and the first encoded image data in the recording medium in response to a recording instruction,
   wherein the control unit ensures a recording area for the second encoded image data in the recording medium based on the estimated data amount of the second encoded image data estimated by the estimation unit, and the encoding unit controls the data amount of the second encoded image data based on the estimated data amount,
   wherein the control unit controls the recording unit to record the second encoded image data in the ensured recording area, and
   wherein, if the imaging apparatus is in a predetermined idle state, the control unit controls the development unit to apply the second development process to the RAW image data to generate the second image data, and controls the encoding unit to encode the generated second image data.

2. The imaging apparatus according to claim 1, wherein the control unit controls the development unit such that the development unit applies the second development process to the RAW image data after the development unit has output the first image data.

3. The imaging apparatus according to claim 1, wherein, in response to recording of the second encoded image data, the control unit controls the recording unit to erase the first encoded image data from the recording medium.

4. The imaging apparatus according to claim 3, wherein the control unit controls the recording unit to overwrite an area where the erased first encoded image data had been recorded with the second encoded image data.

5. The imaging apparatus according to claim 4, wherein the control unit ensures an area corresponding to a difference between the data amount of the first encoded image data and the estimated data amount of the second encoded image data as a recording area for the second encoded image data.

6. The imaging apparatus according to claim 1, wherein the control unit controls the recording unit to record predetermined dummy data in the ensured recording area for the second encoded image data, and, when recording the second encoded image data, controls the recording unit to overwrite the recording area of the dummy data with the second encoded image data.

7. The imaging apparatus according to claim 1, wherein the encoding unit controls the data amount of the second encoded image data such that the data amount of the second encoded image data does not exceed the estimated data amount.

8. The imaging apparatus according to claim 1, wherein the control unit controls the recording unit to record a plurality of pictures of the RAW image data and the first encoded image data corresponding to the plurality of pictures of the RAW image data in the recording medium, and ensures a recording area for a plurality of pictures of the second encoded image data that corresponds to the plurality of pictures of the RAW image data in the recording medium.

9. The imaging apparatus according to claim 8, wherein the control unit controls the development unit to apply the second development process to the plurality of pictures of the RAW image data in a predetermined order, and
wherein, even if the data amount of the second encoded image data corresponding to a picture other than a picture for which the second development process is applied last among the plurality of pictures of the RAW image data has exceeded the estimated data amount, the encoding unit does not control the data amount of the second encoded image data not to exceed the estimated data amount.

10. The imaging apparatus according to claim 1, wherein the first development process has a processing load lower than a processing load of the second development process.

11. An imaging apparatus comprising:
an imaging unit;
an image processing unit configured to acquire RAW image data by using image data obtained by the imaging unit;
a development unit configured to apply a development process to the RAW image data;
an encoding unit configured to encode image data output from the development unit;
an estimation unit configured to, based on one of:
(i) a data amount of the RAW image data; and
(ii) a data amount of first encoded image data obtained by encoding first image data with the encoding unit, wherein the first image data is generated by applying the development process to image data obtained by reducing a quantity of pixels of the RAW image data,
estimate a data amount of second encoded image data to be obtained by encoding second image data with the encoding unit, wherein the second image data is generated by applying the development process to the RAW image data;
a recording unit configured to record data in a recording medium; and
a control unit configured to control the recording unit to record the RAW image data and the first encoded image data in the recording medium in response to a recording instruction,
wherein the control unit ensures a recording area for the second encoded image data in the recording medium based on the estimated data amount of the second encoded image data estimated by the estimation unit, and the encoding unit controls the data amount of the second encoded image data based on the estimated data amount,
wherein the control unit controls the recording unit to record the second encoded image data in the ensured recording area, and
wherein, if the imaging apparatus is in a predetermined idle state, the control unit controls the development unit to apply the development process to the RAW image data to generate the second image data, and controls the encoding unit to encode the generated second image data.

12. A control method of an imaging apparatus, wherein the imaging apparatus comprises:
an imaging unit;
an image processing unit configured to acquire RAW image data by using image data obtained by the imaging unit;
a development unit configured to apply a development process to the RAW image data by using a first development process and a second development process, wherein the second development process is for obtaining an image having higher quality than an image obtained by the first development process;
an encoding unit configured to encode image data output from the development unit; and
a recording unit configured to record data in a recording medium,
the control method comprising:
estimating, based on one of:
(i) a data amount of the RAW image data; and
(ii) a data amount of first encoded image data obtained by encoding first image data with the encoding unit, wherein the first image data is generated by applying the first development process to the RAW image data,
a data amount of second encoded image data to be obtained by encoding second image data with the encoding unit, wherein the second image data is generated by applying the second development process to the RAW image data;
controlling the recording unit to record the RAW image data and the first encoded image data in the recording medium in response to a recording instruction;
ensuring a recording area for the second encoded image data in the recording medium based on the estimated data amount of the second encoded image data estimated in the estimating;
controlling the data amount of the second encoded image data based on the estimated data amount;
controlling the recording unit to record the second encoded image data in the ensured recording area; and
if the imaging apparatus is in a predetermined idle state:
controlling the development unit to apply the second development process to the RAW image data to generate the second image data and
controlling the encoding unit to encode the generated second image data.

13. A control method of an imaging apparatus, wherein the imaging apparatus comprises:
an imaging unit;
an image processing unit configured to acquire RAW image data by using image data obtained by the imaging unit;
a development unit configured to apply a development process to the RAW image data;
an encoding unit configured to encode image data output from the development unit; and
a recording unit configured to record data in a recording medium,
the control method comprising:
estimating, based on one of:
(i) a data amount of the RAW image data; and
(ii) a data amount of first encoded image data obtained by encoding first image data with the encoding unit, wherein the first image data is generated by applying the development process to image data obtained by reducing a quantity of pixels of the RAW image data, a data amount of second encoded image data to be obtained by encoding second image data with the encoding unit, wherein the second image data is generated by applying the development process to the RAW image data;

controlling the recording unit to record the RAW image data and the first encoded image data in the recording medium in response to a recording instruction;

ensuring a recording area for the second encoded image data in the recording medium based on the estimated data amount of the second encoded image data estimated in the estimating;

controlling the data amount of the second encoded image data based on the estimated data amount;

controlling the recording unit to record the second encoded image data in the ensured recording area; and if the imaging apparatus is in a predetermined idle state:
controlling the development unit to apply the development process to the RAW image data to generate the second image data; and
controlling the encoding unit to encode the generated second image data.

14. An imaging apparatus comprising:
an imaging unit;
an image processing unit configured to acquire RAW image data by using image data obtained by the imaging unit;
a development unit configured to apply a development process to the RAW image data by using a first development process and a second development process, wherein the second development process is for obtaining an image having higher quality than an image obtained by the first development process;
an encoding unit configured to encode image data output from the development unit;
an estimation unit configured to, based on one of:
(i) a data amount of the RAW image data; and
(ii) a data amount of first encoded image data obtained by encoding first image data with the encoding unit, wherein the first image data is generated by applying the first development process to the RAW image data,
estimate a data amount of second encoded image data to be obtained by encoding second image data with the encoding unit, wherein the second image data is generated by applying the second development process to the RAW image data;
a recording unit configured to record data in a recording medium; and
a control unit configured to control the recording unit to record the RAW image data and the first encoded image data in the recording medium in response to a recording instruction,
wherein the control unit ensures a recording area for the second encoded image data in the recording medium based on the estimated data amount of the second encoded image data estimated by the estimation unit, and the encoding unit controls the data amount of the second encoded image data based on the estimated data amount,
wherein the control unit controls the recording unit to record the second encoded image data in the ensured recording area, and
wherein the control unit controls the recording unit to record a plurality of pictures of the RAW image data and the first encoded image data corresponding to the plurality of pictures of the RAW image data in the recording medium, and ensures a recording area for a plurality of pictures of the second encoded image data that corresponds to the plurality of pictures of the RAW image data in the recording medium.

15. The imaging apparatus according to claim 14, wherein the control unit controls the development unit to apply the second development process to the plurality of pictures of the RAW image data in a predetermined order, and
wherein, even if the data amount of the second encoded image data corresponding to a picture other than a picture for which the second development process is applied last among the plurality of pictures of the RAW image data has exceeded the estimated data amount, the encoding unit does not control the data amount of the second encoded image data not to exceed the estimated data amount.

16. An imaging apparatus comprising:
an imaging unit;
an image processing unit configured to acquire RAW image data by using image data obtained by the imaging unit;
a development unit configured to apply a development process to the RAW image data by using a first development process and a second development process, wherein the second development process is for obtaining an image having higher quality than an image obtained by the first development process, and wherein the first development process has a processing load lower than a processing load of the second development process;
an encoding unit configured to encode image data output from the development unit;
an estimation unit configured to, based on one of:
(i) a data amount of the RAW image data; and
(ii) a data amount of first encoded image data obtained by encoding first image data with the encoding unit, wherein the first image data is generated by applying the first development process to the RAW image data,
estimate a data amount of second encoded image data to be obtained by encoding second image data with the encoding unit, wherein the second image data is generated by applying the second development process to the RAW image data;
a recording unit configured to record data in a recording medium; and
a control unit configured to control the recording unit to record the RAW image data and the first encoded image data in the recording medium in response to a recording instruction,
wherein the control unit ensures a recording area for the second encoded image data in the recording medium based on the estimated data amount of the second encoded image data estimated by the estimation unit, and the encoding unit controls the data amount of the second encoded image data based on the estimated data amount, and
wherein the control unit controls the recording unit to record the second encoded image data in the ensured recording area.

17. The imaging apparatus according to claim 16, wherein, in response to recording of the second encoded image data, the control unit controls the recording unit to erase the first encoded image data from the recording medium.

18. The imaging apparatus according to claim 17, wherein the control unit controls the recording unit to overwrite an area where the erased first encoded image data had been recorded with the second encoded image data.

19. The imaging apparatus according to claim 18, wherein the control unit ensures an area corresponding to a difference between the data amount of the first encoded image data and the estimated data amount of the second encoded image data as a recording area for the second encoded image data.

20. The imaging apparatus according to claim 16, wherein the encoding unit controls the data amount of the second encoded image data such that the data amount of the second encoded image data does not exceed the estimated data amount.

21. A control method of an imaging apparatus, wherein the imaging apparatus comprises:
an imaging unit;
an image processing unit configured to acquire RAW image data by using image data obtained by the imaging unit;
a development unit configured to apply a development process to the RAW image data by using a first development process and a second development process, wherein the second development process is for obtaining an image having higher quality than an image obtained by the first development process;
an encoding unit configured to encode image data output from the development unit; and
a recording unit configured to record data in a recording medium,
the control method comprising:
estimating, based on one of:
(i) a data amount of the RAW image data; and
(ii) a data amount of first encoded image data obtained by encoding first image data with the encoding unit, wherein the first image data is generated by applying the first development process to the RAW image data,
a data amount of second encoded image data to be obtained by encoding second image data with the encoding unit, wherein the second image data is generated by applying the second development process to the RAW image data;
controlling the recording unit to record the RAW image data and the first encoded image data in the recording medium in response to a recording instruction;
ensuring a recording area for the second encoded image data in the recording medium based on the estimated data amount of the second encoded image data estimated in the estimating;
controlling the data amount of the second encoded image data based on the estimated data amount;
controlling the recording unit to record the second encoded image data in the ensured recording area;
controlling the recording unit to record a plurality of pictures of the RAW image data and the first encoded image data corresponding to the plurality of pictures of the RAW image data in the recording medium; and
ensuring a recording area for a plurality of pictures of the second encoded image data that corresponds to the plurality of pictures of the RAW image data in the recording medium.

22. A control method of an imaging apparatus, wherein the imaging apparatus comprises:
an imaging unit;
an image processing unit configured to acquire RAW image data by using image data obtained by the imaging unit;
a development unit configured to apply a development process to the RAW image data by using a first development process and a second development process, wherein the second development process is for obtaining an image having higher quality than an image obtained by the first development process, and wherein the first development process has a processing load lower than a processing load of the second development process;
an encoding unit configured to encode image data output from the development unit; and
a recording unit configured to record data in a recording medium,
the control method comprising:
estimating, based on one of:
(i) a data amount of the RAW image data; and
(ii) a data amount of first encoded image data obtained by encoding first image data with the encoding unit, wherein the first image data is generated by applying the first development process to the RAW image data,
a data amount of second encoded image data to be obtained by encoding second image data with the encoding unit, wherein the second image data is generated by applying the second development process to the RAW image data;
controlling the recording unit to record the RAW image data and the first encoded image data in the recording medium in response to a recording instruction;
ensuring a recording area for the second encoded image data in the recording medium based on the estimated data amount of the second encoded image data estimated in the estimating;
controlling the data amount of the second encoded image data based on the estimated data amount; and
controlling the recording unit to record the second encoded image data in the ensured recording area.

* * * * *